(12) United States Patent
Knappenberger et al.

(10) Patent No.: US 12,137,832 B2
(45) Date of Patent: Nov. 12, 2024

(54) DIGITAL POWER SUPPLY

(71) Applicant: Weber-Stephen Products LLC, Palatine, IL (US)

(72) Inventors: Eric Knappenberger, Chicago, IL (US); Julio C. Zuleta, Gilberts, IL (US); Matthew Lerch, Chicago, IL (US); Jeffery C. Emmerich, Delavan, WI (US)

(73) Assignee: Weber-Stephen Products LLC, Palatine, IL (US)

( * ) Notice: Subject to any disclaimer, the term of this patent is extended or adjusted under 35 U.S.C. 154(b) by 937 days.

(21) Appl. No.: 16/688,287

(22) Filed: Nov. 19, 2019

(65) Prior Publication Data

US 2020/0100615 A1    Apr. 2, 2020

Related U.S. Application Data

(62) Division of application No. 15/200,759, filed on Jul. 1, 2016, now Pat. No. 10,537,199.

(51) Int. Cl.
*A47J 27/62* (2006.01)
*A47J 37/06* (2006.01)
(Continued)

(52) U.S. Cl.
CPC ........... *A47J 27/62* (2013.01); *A47J 37/0629* (2013.01); *A47J 37/0676* (2013.01); *A47J 37/0709* (2013.01); *H05B 1/0261* (2013.01)

(58) Field of Classification Search
CPC .... A47J 37/0629; A47J 27/62; A47J 37/0676; A47J 37/0709; H05B 3/68; H05B 1/0261; H02M 1/08
See application file for complete search history.

(56) References Cited

U.S. PATENT DOCUMENTS 3,775,591 A    11/1973   Gould
4,193,921 A     3/1980   Furst
(Continued)

FOREIGN PATENT DOCUMENTS

CA    3000527 C    12/2020
CN    1169783 A     1/1998
(Continued)

OTHER PUBLICATIONS

United States Patent and Trademark Office, "Notice of Allowance and Fee(s) Due," issued in connection with U.S. Appl. No. 15/493,611, dated May 25, 2022, 5 pages.

(Continued)

*Primary Examiner* — Thienvu V Tran
*Assistant Examiner* — Yahveh Comas Torres
(74) *Attorney, Agent, or Firm* — Hanley, Flight & Zimmerman

(57) ABSTRACT

Provided is an apparatus and method for a digital power supply that can provide independent power control, and control variable power, for two or more electrical loads. Disclosed embodiments may reduce the magnitude of harmonic currents and/or flicker introduced into a power system. Embodiments include a microprocessor that delivers power to electric loads using phase-controlled AC current. The microprocessor may calculate a power array corresponding to a requested power for each electric load. Logic is provided for populating the power army in a pattern that reduces the magnitude of harmonic currents and flicker.

6 Claims, 18 Drawing Sheets

(51) Int. Cl.
*A47J 37/07* (2006.01)
*H05B 1/02* (2006.01)

(56) References Cited

U.S. PATENT DOCUMENTS

| | | | |
|---|---|---|---|
| 4,219,857 A | 8/1980 | Haraldsson et al. |
| 4,493,980 A | 1/1985 | Payne |
| 4,634,843 A | 1/1987 | Payne |
| 4,720,623 A | 1/1988 | DiCesare et al. |
| 4,780,787 A | 10/1988 | Dano et al. |
| 4,780,878 A | 10/1988 | Hackel |
| 5,171,973 A | 12/1992 | Higgins |
| 5,280,422 A | 1/1994 | Moe et al. |
| 5,302,857 A | 4/1994 | Charles et al. |
| 5,309,311 A | 5/1994 | Ballada |
| 5,347,104 A | 9/1994 | Morishima |
| 5,413,032 A | 5/1995 | Bruno et al. |
| 5,524,528 A | 6/1996 | Yeh |
| 5,578,230 A | 11/1996 | Eldon |
| 5,606,245 A | 2/1997 | Kirby |
| 5,710,408 A | 1/1998 | Jones |
| 5,719,377 A | 2/1998 | Giebel et al. |
| 5,747,972 A | 5/1998 | Baretich |
| 5,908,571 A | 6/1999 | Scott |
| 5,982,593 A | 11/1999 | Kimblin et al. |
| 5,986,242 A | 11/1999 | Maitani |
| 5,994,671 A | 11/1999 | Suzuki et al. |
| 6,037,571 A | 3/2000 | Christopher |
| 6,057,997 A | 5/2000 | Mackenzie et al. |
| 6,111,230 A | 8/2000 | Cao |
| 6,118,106 A | 9/2000 | Scott |
| 6,246,831 B1 | 6/2001 | Seitz |
| 6,697,244 B1 | 2/2004 | Bauer et al. |
| 6,727,475 B2 | 4/2004 | Kennard |
| 6,849,833 B2 | 2/2005 | Harrington |
| 6,927,368 B2 | 8/2005 | Cao |
| 7,131,549 B2 | 11/2006 | Hook |
| 7,312,426 B2 | 12/2007 | Han |
| 7,342,202 B2 | 3/2008 | Bachinski |
| 7,368,686 B2 | 5/2008 | Etheredge |
| 7,675,007 B2 | 3/2010 | Ashton et al. |
| 7,825,353 B2 | 11/2010 | Shingler |
| 8,030,598 B2 | 10/2011 | Bachinski |
| 8,097,835 B2 | 1/2012 | Hsieh |
| 8,102,080 B2 | 1/2012 | Fonseca et al. |
| 8,141,478 B2 | 3/2012 | Kuo |
| 8,263,911 B2 | 9/2012 | Yen |
| 8,624,169 B1 | 1/2014 | Sorenson et al. |
| 8,680,440 B2 | 3/2014 | Cohen |
| 8,927,908 B2 | 1/2015 | Wang |
| 9,978,553 B2 | 5/2018 | Tomimbang et al. |
| 11,454,677 B2 | 9/2022 | Knappenberger et al. |
| 2001/0033743 A1 | 10/2001 | Kishita |
| 2003/0024105 A1 | 2/2003 | Chiu |
| 2003/0072581 A1 | 4/2003 | Nishida |
| 2003/0218846 A1 | 11/2003 | Telamo |
| 2004/0008016 A1 | 1/2004 | Sutardja et al. |
| 2004/0169031 A1 | 9/2004 | Kang |
| 2005/0189929 A1 | 9/2005 | Schulz |
| 2006/0043087 A1 | 3/2006 | Gagas et al. |
| 2006/0050464 A1 | 3/2006 | Von Arx et al. |
| 2007/0116485 A1 | 5/2007 | Nishida |
| 2007/0145034 A1 | 6/2007 | Imura |
| 2007/0208520 A1 | 9/2007 | Zhang et al. |
| 2007/0262074 A1 | 11/2007 | Shearer |
| 2008/0031302 A1 | 2/2008 | Rund et al. |
| 2008/0036581 A1 | 2/2008 | Bunims |
| 2008/0136581 A1 | 6/2008 | Heilman et al. |
| 2008/0165461 A1 | 7/2008 | Paik |
| 2009/0154033 A1 | 6/2009 | Tomimbang |
| 2009/0167085 A1* | 7/2009 | Fonseca ............... H05B 1/0261 |
| | | 307/32 |
| 2010/0191487 A1 | 7/2010 | Rada |
| 2010/0208501 A1 | 8/2010 | Matan |
| 2010/0245025 A1 | 9/2010 | de Leon et al. |
| 2010/0296217 A1 | 11/2010 | Darmann |
| 2011/0095011 A1 | 4/2011 | Kawazu |
| 2011/0132900 A1 | 6/2011 | Kinoshita et al. |
| 2011/0160931 A1 | 6/2011 | Hsieh |
| 2011/0284518 A1 | 11/2011 | Elston, III et al. |
| 2012/0133478 A1 | 5/2012 | Chiu |
| 2012/0301171 A1 | 11/2012 | Maruyama |
| 2013/0200792 A1 | 8/2013 | Brooks |
| 2013/0271886 A1 | 10/2013 | Cull et al. |
| 2013/0334212 A1 | 12/2013 | Sawada et al. |
| 2014/0005834 A1 | 1/2014 | Hoffman |
| 2014/0242227 A1 | 8/2014 | Yang et al. |
| 2015/0298590 A1 | 10/2015 | Lamesch |
| 2015/0312964 A1 | 10/2015 | Sorenson et al. |
| 2015/0346264 A1 | 12/2015 | Curtis |
| 2016/0003484 A1 | 1/2016 | Span et al. |
| 2016/0044745 A1* | 2/2016 | Nakayama ............ H05B 1/0241 |
| | | 219/481 |
| 2016/0149671 A1 | 5/2016 | Yang |
| 2016/0167395 A1 | 6/2016 | Albonetti |
| 2016/0196739 A1 | 7/2016 | Naber et al. |
| 2016/0231721 A1 | 8/2016 | Lakshmanan et al. |
| 2016/0233770 A1 | 8/2016 | Arakawa et al. |
| 2016/0241721 A1 | 8/2016 | Soelberg et al. |
| 2016/0254742 A1 | 9/2016 | Krumpholz |
| 2016/0359325 A1 | 12/2016 | Kawata |
| 2017/0020324 A1 | 1/2017 | Young et al. |
| 2018/0000277 A1 | 1/2018 | Knappenberger et al. |
| 2018/0004271 A1 | 1/2018 | Knappenberger et al. |
| 2018/0007738 A1 | 1/2018 | Knappenberger et al. |
| 2018/0007739 A1 | 1/2018 | Knappenberger et al. |
| 2019/0145110 A1 | 5/2019 | Seow |
| 2020/0084837 A1 | 3/2020 | Knappenberger et al. |
| 2020/0100615 A1 | 4/2020 | Knappenberger et al. |
| 2020/0201414 A1 | 6/2020 | Knappenberger et al. |

FOREIGN PATENT DOCUMENTS

| | | |
|---|---|---|
| CN | 1508479 | 6/2004 |
| CN | 1535404 A | 10/2004 |
| CN | 1692543 A | 11/2005 |
| CN | 2847774 | 12/2006 |
| CN | 101277558 | 10/2008 |
| CN | 101577191 | 11/2009 |
| CN | 101647167 A | 2/2010 |
| CN | 201434433 | 3/2010 |
| CN | 201690063 U | 12/2010 |
| CN | 102193443 A | 9/2011 |
| CN | 102388522 A | 3/2012 |
| CN | 102780134 A | 11/2012 |
| CN | 202817705 | 3/2013 |
| CN | 103142147 | 6/2013 |
| CN | 103263224 | 8/2013 |
| CN | 203167321 | 8/2013 |
| CN | 203238304 | 10/2013 |
| CN | 103416104 A | 11/2013 |
| CN | 103645730 | 3/2014 |
| CN | 103926970 A | 7/2014 |
| CN | 203785271 U | 8/2014 |
| CN | 104065699 | 9/2014 |
| CN | 104577950 A | 4/2015 |
| CN | 204595584 | 8/2015 |
| CN | 105628217 A | 6/2016 |
| CN | 105632140 A | 6/2016 |
| CN | 106162976 | 11/2016 |
| CN | 205669947 U | 11/2016 |
| CN | 106211395 | 12/2016 |
| CN | 111522388 A | 8/2020 |
| CN | 112103909 A | 12/2020 |
| DE | 19842470 | 3/2000 |
| EP | 230246 | 7/1987 |
| EP | 258091 | 3/1988 |
| EP | 0496549 A2 | 7/1992 |
| EP | 615327 | 9/1994 |
| EP | 0804049 A2 | 10/1997 |
| EP | 906000 | 3/1999 |
| EP | 1854719 | 11/2007 |
| EP | 2144258 A1 | 1/2010 |
| EP | 2214458 A1 | 8/2010 |

(56) References Cited

FOREIGN PATENT DOCUMENTS

| | | | | |
|---|---|---|---|---|
| EP | 3062431 | A1 | 8/2016 | |
| EP | 3399613 | A1 | 11/2018 | |
| GB | 2067857 | A | 7/1981 | |
| GB | 2073455 | A | 10/1981 | |
| GB | 2239138 | | 6/1991 | |
| GB | 2252647 | | 8/1992 | |
| GB | 2329769 | | 3/1999 | |
| GB | 2339348 | A * | 1/2000 | ........... H05B 1/0266 |
| GB | 2508198 | A | 5/2014 | |
| JP | S53-050152 | | 5/1978 | |
| JP | S54149042 | | 11/1979 | |
| JP | S56140422 | A | 11/1981 | |
| JP | S57-011618 | | 1/1982 | |
| JP | S60129813 | A | 7/1985 | |
| JP | S6129916 | A | 2/1986 | |
| JP | S61128033 | | 8/1986 | |
| JP | S62-010513 | | 1/1987 | |
| JP | S62-073584 | | 5/1987 | |
| JP | S62-178821 | | 11/1987 | |
| JP | S63-049634 | | 4/1988 | |
| JP | S63107412 | | 7/1988 | |
| JP | 02246769 | A * | 10/1990 | |
| JP | H02246769 | A | 10/1990 | |
| JP | H3251618 | | 11/1991 | |
| JP | H03251618 | A | 11/1991 | |
| JP | 04073523 | A * | 3/1992 | |
| JP | H4-73523 | A | 3/1992 | |
| JP | H04-073523 | | 6/1992 | |
| JP | H04-249088 | | 9/1992 | |
| JP | H4-336608 | A | 11/1992 | |
| JP | H06-141003 | | 5/1994 | |
| JP | H07-078668 | | 3/1995 | |
| JP | H7123504 | | 5/1995 | |
| JP | 09060888 | A * | 3/1997 | |
| JP | H0960888 | A | 3/1997 | |
| JP | H9-182278 | | 7/1997 | |
| JP | H09-258599 | | 10/1997 | |
| JP | H1010917 | A * | 1/1998 | |
| JP | S60129813 | * | 7/1998 | |
| JP | H11-018281 | | 1/1999 | |
| JP | H11-185953 | | 7/1999 | |
| JP | 2001308572 | | 11/2001 | |
| JP | 2002095586 | | 4/2002 | |
| JP | 2003014241 | | 1/2003 | |
| JP | 2003086347 | | 3/2003 | |
| JP | 2003151759 | | 5/2003 | |
| JP | 2004-164431 | A | 6/2004 | |
| JP | 2004212601 | | 7/2004 | |
| JP | 2005034379 | | 2/2005 | |
| JP | 2005085514 | A | 3/2005 | |
| JP | 2005195640 | | 7/2005 | |
| JP | 2005221086 | | 8/2005 | |
| JP | 3794574 | B2 * | 7/2006 | |
| JP | 2006340469 | | 12/2006 | |
| JP | 2008512979 | | 4/2008 | |
| JP | 2008175437 | | 7/2008 | |
| JP | 2008180472 | | 8/2008 | |
| JP | 2008183763 | | 8/2008 | |
| JP | 2008223320 | | 9/2008 | |
| JP | 2008300171 | | 12/2008 | |
| JP | 2009510667 | | 3/2009 | |
| JP | 2009296802 | | 12/2009 | |
| JP | 2010515976 | | 5/2010 | |
| JP | 2010181044 | | 8/2010 | |
| JP | 2011067311 | | 4/2011 | |
| JP | 2011096484 | | 5/2011 | |
| JP | 2012-242779 | A | 12/2012 | |
| JP | 2012252851 | | 12/2012 | |
| JP | 2013518556 | | 5/2013 | |
| JP | 2014-114967 | A | 6/2014 | |
| JP | 2014182715 | A | 9/2014 | |
| JP | 2014190626 | | 10/2014 | |
| JP | 2015047389 | | 3/2015 | |
| JP | 2015172447 | | 10/2015 | |
| JP | 2015190643 | | 11/2015 | |
| JP | 2016151383 | | 8/2016 | |
| JP | 2018007549 | | 1/2018 | |
| WO | 2014079493 | A1 | 5/2014 | |
| WO | 2014079735 | | 5/2014 | |
| WO | 2015013985 | A1 | 2/2015 | |
| WO | 2015078346 | A1 | 6/2015 | |
| WO | 20150115663 | | 8/2015 | |
| WO | 20150138985 | | 9/2015 | |
| WO | 2016105551 | | 6/2016 | |

OTHER PUBLICATIONS

United States Patent and Trademark Office, "Non-Final Office Action," issued in connection with U.S. Appl. No. 16/724,807, dated Jun. 24, 2022, 14 pages.
United States Patent and Trademark Office, "Corrected Notice of Allowance," issued in connection with U.S. Appl. No. 15/493,611, dated Jul. 5, 2022, 2 pages.
United States Patent and Trademark Office, "Non-Final Office Action," issued in connection with U.S. Appl. No. 16/688,354, dated Jul. 6, 2022, 9 pages.
Examination Report No. 1, dated Apr. 29, 2020, in corresponding Australian Application No. 2019203341.
Second Office Action dated Jul. 2, 2020 in corresponding Chinese Application No. 201810418245.4.
Japanese Patent Office, "Decision to Grant a Patent," issued in connection with Japanese Patent Application No. 2019-142088, dated Nov. 16, 2021, 4 pages.
Japanese Patent Office, "Notice of Reasons for Refusal," issued in connection with Japanese Patent Application No. 2019-224437, dated Nov. 30, 2021, 12 pages.
Australian Patent Office, "Notice of Acceptance for patent application," issued in connection with Australian Patent Application No. 2020202616, dated Dec. 1, 2021, 3 pages.
Chinese Patent Office, "Fifth Office Action," issued in connection with Chinese Patent Application No. 201810418245.4, dated Nov. 3, 2021, 7 pages.
United States Patent and Trademark Office, "Final Office Action," issued in connection with U.S. Appl. No. 16/688,354, dated Jan. 7, 2022, 13 pages.
Notice of Reason for Rejection dated May 12, 2020 in corresponding Japanese Application No. 2018-085657.
Japanese Patent Office, "Notice of Reason for Rejection," issued in connection with Japanese Patent Application No. 2021-202976, dated Nov. 1, 2022, 6 pages (English translation included).
United States Patent and Trademark Office, "Final Office Action," issued in connection with U.S. Appl. No. 16/724,807, dated Nov. 10, 2022, 22 pages.
IP Australia, "Notice of Acceptance," issued in connection with Australian Patent Application No. 2021212146, dated Nov. 11, 2022, 3 pages.
United States Patent and Trademark Office, "Notice of Allowance and Fee(s) Due," issued in connection with U.S. Appl. No. 16/688,354, dated Nov. 23, 2022, 5 pages.
European Patent Office, "Extended European Search Report," issued in connection with European Patent Application No. 22180377.8, dated Jan. 25, 2023, 7 pages.
China National Intellectual Property Administration, "Third Office Action," issued in connection with Chinese Patent Application No. 202010985725.6, dated Jan. 20, 2023, 8 pages.
United States Patent and Trademark Office, "Notice of Allowance and Fee(s) Due," issued in connection with U.S. Appl. No. 16/724,807, dated Mar. 1, 2023, 11 pages.
United States Patent and Trademark Office, "Corrected Notice of Allowabilty," issued in connection with U.S. Appl. No. 16/688,354, dated Mar. 7, 2023, 2 pages.
U.S. Appl. No. 10/524,312, filed Dec. 31, 2019, Knappenberger et al.
U.S. Appl. No. 10/537,199, filed Jan. 21, 2020, Knappenberger et al.
U.S. Appl. No. 10/551,893, filed Feb. 4, 2020, Knappenberger et al.
European Patent Office, "Partial European Search Report," dated Dec. 6, 2017, in corresponding European Application 17179223.7, 10 pages.

(56) References Cited

OTHER PUBLICATIONS

European Patent Office, "Extended European Search Report," dated Mar. 27, 2018, in corresponding European Application 17179223.7, 12 pages.
Japanese Patent Office, "Official Action," dated Jul. 31, 2018 in corresponding Japanese Patent Application 2017-128811, 21 pages.
European Patent Office, "Extended European Search Report," dated Sep. 12, 2018 in corresponding European Patent Application No. 18169824.2, 8 pages.
Chinese Patent Office, "First Office Action and Search Report," dated Oct. 9, 2018 in corresponding Chinese Application No. 201710521319.2, 3 pages.
Australian Patent Office, "Notice of Acceptance for patent application," dated Nov. 29, 2018 in corresponding Australian Application No. 2017204387, 3 pages.
Japanese Patent Office, "Search Report," dated Mar. 19, 2019 in corresponding Japanese Application No. 2018-085656, 102 pages.
Chinese Patent Office, "Office Action," dated Apr. 22, 2019 in corresponding Chinese Application No. 201810415364.4, 18 pages.
Chinese Patent Office, "Third Office Action," dated Mar. 16, 2020, in corresponding Chinese Application No. 201810415364.4, 19 pages.
United States Patent and Trademark Office, "Final Office Action," issued in connection with U.S. Appl. No. 15/493,611, dated Oct. 16, 2020, 14 pages.
United States Patent and Trademark Office, "Non-Final Office Action," issued in connection with U.S. Appl. No. 15/493,611, dated Apr. 19, 2021, 14 pages.
United States Patent and Trademark Office, "Requirement for Restriction," issued in connection with U.S. Appl. No. 15/493,696, dated Feb. 13, 2019, 6 pages.
United States Patent and Trademark Office, "Non-Final Office Action," issued in connection with U.S. Appl. No. 15/493,696, dated May 7, 2019, 7 pages.
United States Patent and Trademark Office, "Notice of Allowance," issued in connection with U.S. Appl. No. 15/493,696, dated Sep. 24, 2019, 7 pages.
United States Patent and Trademark Office, "Supplemental Notice of Allowance," issued in connection with U.S. Appl. No. 15/493,696, dated Nov. 29, 2019, 2 pages.
United States Patent and Trademark Office, "Non-Final Office Action," issued in connection with U.S. Appl. No. 15/200,687, dated Oct. 12, 2018, 9 pages.
United States Patent and Trademark Office, "Final Office Action," issued in connection with U.S. Appl. No. 15/200,687, dated Mar. 29, 2019, 10 pages.
United States Patent and Trademark Office, "Notice of Allowance," issued in connection with U.S. Appl. No. 15/200,687, dated Aug. 19, 2019, 7 pages.
United States Patent and Trademark Office, "Non-Final Office Action," issued in connection with U.S. Appl. No. 15/200,759, dated Mar. 15, 2019, 18 pages.
United States Patent and Trademark Office, "Final Office Action," issued in connection with U.S. Appl. No. 15/493,611, dated Aug. 11, 2021, 14 pages.
United States Patent and Trademark Office, "Notice of Allowance," issued in connection with U.S. Appl. No. 15/200,759, dated Aug. 19, 2019, 8 pages.
Australian Patent Office, "Examination Report No. 1," issued in connection with Australian Patent Application No. 2019201672, dated Jan. 14, 2020, 2 pages.
Australian Patent Office, "Notice of Acceptance," issued in connection with Australian Patent Application No. 2019201672, dated May 20, 2020, 3 pages.
Australian Patent Office, "Examination Report No. 1," issued in connection with Australian Patent Application No. 2020202616, dated Apr. 29, 2021, 6 pages.
Australian Patent Office, "Examination Report No. 2," issued in connection with Australian Patent Application No. 2020202616, dated Sep. 21, 2021, 3 pages.
Canadian Patent Office, "Examiner Requisition" issued in connection with Canadian Patent Application No. 2971815, dated Jul. 19, 2018, 4 pages.
Canadian Patent Office, "Examiner Requisition" issued in connection with Canadian Patent Application No. 2971815, dated Feb. 17, 2020, 3 pages.
Australian Patent Office, "Examination Report No. 1," issued in connection with Australian Patent Application No. 2018202492, dated Apr. 5, 2019, 3 pages.
Australian Patent Office, "Examination Report No. 2," issued in connection with Australian Patent Application No. 2018202492, dated Aug. 26, 2019, 2 pages.
Australian Patent Office, "Notice of Acceptance," issued in connection with Australian Patent Application No. 2018202492, dated Oct. 24, 2019, 3 pages.
Australian Patent Office, "Examination Report No. 1," issued in connection with Australian Patent Application No. 2020200829, dated Feb. 10, 2021, 7 pages.
Australian Patent Office, "Notice of Acceptance," issued in connection with Australian Patent Application No. 2020200829, dated Jun. 23, 2021, 3 pages.
Canadian Patent Office, "Office Action," issued in connection with Canadian Patent Application No. 3000527, dated Mar. 11, 2019, 3 pages.
Canadian Patent Office, "Office Action," issued in connection with Canadian Patent Application No. 3000527, dated Nov. 20, 2019, 4 pages.
Canadian Patent Office, "Office Action," issued in connection with Canadian Patent Application No. 3094309, dated Sep. 23, 2021, 4 pages.
Chinese Patent Office, "Second Office Action," issued in connection with Chinese Patent Application No. 201810415364.4, dated Sep. 20, 2019, 7 pages (English translation provided).
Chinese Patent Office, "Notification to Grant Patent Right for Invention," issued in connection with Chinese Patent Application No. 201810415364.4, dated Jul. 6, 2020, 3 pages (English translation provided).
European Patent Office, "Intention to Grant," issued in connection with European Patent Application No. 18169824.2, dated Apr. 29, 2021, 8 pages.
Japanese Patent Office, "Search Report," issued in connection with Japanese Patent Application No. 2018-085656, dated Mar. 14, 2019, 102 pages (English translation provided).
Japanese Patent Office, "Decision to Grant a Patent," issued in connection with Japanese Patent Application No. 2018-085656, dated Nov. 12, 2019, 5 pages (English translation provided).
Japanese Patent Office, "Search Report," issued in connection with Japanese Patent Application No. 2019-224437, dated Dec. 7, 2020, 72 pages (English translation provided).
Chinese Patent Office, "Second Office Action," issued in connection with Chinese Patent Application No. 201710521319.2, dated Jun. 28, 2019, 7 pages (English translation provided).
Chinese Patent Office, "Notification to Grant Patent Right for Invention," issued in connection with Chinese Patent Application No. 201710521319.2, dated Oct. 9, 2019, 3 pages (English translation provided).
Chinese Patent Office, "First Office Action," issued in connection with Chinese Patent Application No. 201911342769.0, dated May 27, 2021, 33 pages (English translation provided).
Japanese Patent Office, "Search Report," issued in connection with Japanese Patent Application No. 2017-128811, dated Jun. 11, 2018, 15 pages (English translation provided).
Japanese Patent Office, "Decision to Grant a Patent," issued in connection with Japanese Patent Application No. 2017-128811, dated Jul. 2, 2019, 5 pages (English translation provided).
Japanese Patent Office, "Search Report," issued in connection with Japanese Patent Application No. 2019-142088, dated Oct. 12, 2020, 18 pages (English translation provided).
Japanese Patent Office, "Office Action," issued in connection with Japanese Patent Application No. 2019-142088, dated Oct. 27, 2020, 11 pages (English translation provided).

(56) References Cited

OTHER PUBLICATIONS

Japanese Patent Office, "Office Action," issued in connection with Japanese Patent Application No. 2019-142088, dated Jun. 22, 2021, 4 pages (English translation provided).
Australian Patent Office, "Examination Report No. 2," issued in connection with Australian Patent Application No. 2017204389, dated Jun. 13, 2018, 3 pages.
Australian Patent Office, "Examination Report No. 3," issued in connection with Australian Patent Application No. 2017204389, dated Oct. 26, 2018, 4 pages.
Australian Patent Office, "Notice of Acceptance," issued in connection with Australian Patent Application No. 2017204389, dated Feb. 1, 2019, 3 pages.
Australian Patent Office, "Notice of Acceptance," issued in connection with Australian Patent Application No. 2019203341, dated Aug. 17, 2020, 3 pages.
Australian Patent Office, "Examination Report No. 1," issued in connection with Australian Patent Application No. 2020260545, dated Oct. 29, 2021, 5 pages.
Canadian Patent Office, "Office Action," issued in connection with Canadian Patent Application No. 2971814, dated Jun. 19, 2018, 3 pages.
Canadian Patent Office, "Office Action," issued in connection with Canadian Patent Application No. 2971814, dated Jun. 19, 2019, 3 pages.
Canadian Patent Office, "Office Action," issued in connection with Canadian Patent Application No. 2971814, dated Sep. 3, 2020, 11 pages.
Canadian Patent Office, "Notice of Allowance," issued in connection with Canadian Patent Application No. 2971814, dated Jul. 14, 2021, 7 pages.
Australian Patent Office, "Notice of Acceptance," issued in connection with Australian Application No. 2018202490, dated Feb. 21, 2019, 3 pages.
Australian Patent Office, "Examination Report No. 1," issued in connection with Australian Patent Application No. 2019203941, dated Jun. 18, 2020, 4 pages.
Australian Patent Office, "Notice of Acceptance," issued in connection with Australian Patent Application No. 2019203941, dated Oct. 31, 2020, 3 pages.
Australian Patent Office, "Examination Report No. 1," issued in connection with Australian Patent Application No. 2021200734, dated Oct. 29, 2021, 6 pages.
Canadian Patent Office, "Notice of Allowance," issued in connection with Canadian Patent Application No. 300542, dated May 10, 2021, 6 pages.
Chinese Patent Office, "First Office Action," issued in connection with Chinese Patent Application No. 201810418245.4, dated Sep. 20, 2019, 20 pages (English translation provided).
Chinese Patent Office, "Third Office Action," issued in connection with Chinese Patent Application No. 201810418245.4, dated Mar. 1, 2021, 26 pages (English translation provided).
Chinese Patent Office, "Fourth Office Action," issued in connection with Chinese Patent Application No. 201810418245.4, dated Jun. 30, 2021, 21 pages (English translation provided).
European Patent Office, "Examination Report," issued in connection with European Patent Application No. 18169911.7, dated Dec. 4, 2020, 5 pages.
Japanese Patent Office, "Search Report," issued in connection with Japanese Patent Application No. 2018-085657, dated Jun. 19, 2019, 32 pages (English translation provided).
Japanese Patent Office, "Decision to Grant a Patent," issued in connection with Japanese Patent Application No. 2018-085657, dated Jan. 12, 2021, 5 pages (English translation provided).
Chinese Patent Office, "Third Office Action," issued in connection with Chinese Patent Application No. 201710521776.1, dated Sep. 18, 2019, 8 pages (English translation provided).
Chinese Patent Office, "Notification to Grant Patent Right for Invention," issued in connection with Chinese Patent Application No. 201710521776.1, dated Mar. 4, 2020, 3 pages (English translation provided).
Chinese Patent Office, "First Office Action," issued in connection with Chinese Patent Application No. 202010379486.X, dated Jul. 5, 2021, 11 pages (English translation provided).
European Patent Office, "Examination Report," issued in connection with European Patent Application No. 17179224.5, dated Oct. 23, 2020, 4 pages.
Japanese Patent Office, "Search Report," issued in connection with Japanese Patent Application No. 2017-128814, dated May 23, 2018, 59 pages (English translation provided).
Japanese Patent Office, "Decision to Grant a Patent," issued in connection with Japanese Patent Application No. 2017-128814, dated Oct. 23, 2018, 5 pages (English translation provided).
Japanese Patent Office, "Search Report," issued in connection with Japanese Patent Application No. 2018-154680, dated Jun. 19, 2019, 30 pages (English translation provided).
Japanese Patent Office, "Decision to Grant a Patent," issued in connection with Japanese Patent Application No. 2018-154680, dated Oct. 15, 2019, 5 pages (English translation provided).
Japanese Patent Office, "Office Action," issued in connection with Japanese Patent Application No. 2019-206237, dated Oct. 6, 2020, 15 pages (English translation provided).
Japanese Patent Office, "Office Action," issued in connection with Japanese Patent Application No. 2019-206237, dated Jan. 19, 2021, 6 pages (English translation provided).
Japanese Patent Office, "Decision to Grant a Patent," issued in connection with Japanese Patent Application No. 2019-206237, dated Apr. 27, 2021, 5 pages (English translation provided).
United States Patent and Trademark Office, "Non-Final Office Action," issued in connection with U.S. Appl. No. 16/688,354, dated Aug. 11, 2021, 13 pages.
United States Patent and Trademark Office, "Non-Final Office Action," issued in connection with U.S. Appl. No. 15/493,611, dated Jul. 30, 2019, 12 pages.
United States Patent and Trademark Office, "Final Office Action", issued in connection with U.S. Appl. No. 15/493,611, dated Dec. 31, 2019, 13 pages.
United States Patent and Trademark Office, "Non-Final Office Action," issued in connection with U.S. Appl. No. 15/493,611, dated Jun. 1, 2020, 13 pages.
European Patent Office, "Decision to Grant," issued in connection with European Patent Application No. 17179224.5, dated Jul. 28, 2022, 2 pages.
United States Patent and Trademark Office, "Corrected Notice of Allowance," issued in connection with U.S. Appl. No. 15/493,611, dated Aug. 9, 2022, 2 pages.
China National Intellectual Property Administration, "Second Office Action," issued in connection with Chinese Patent Application No. 202010985725.6, dated Sep. 20, 2022, 11 pages.
European Patent Office, "Invitation pursuant to Rule 63(1) EPC," issued in connection with European Patent Application No. 22180377.8, dated Oct. 6, 2022, 3 pages.
Canadian Intellectual Property Office, "Office Action," issued in connection with Canadian Patent Application No. 3129669, dated Oct. 11, 2022, 5 pages.
Chinese Patent Office, "Second Office Action," issued in connection with Chinese Patent Application No. 202010379486.X, dated Jan. 11, 2022, 5 pages.
China National Intellectual Property Administration, "Notification to Grant Patent Right for Invention," Issued in connection with Chinese Patent Application No. 2019113427690, dated Jan. 18, 2022, 4 pages.
European Patent Office, "Examination Report," issued in connection with European Patent Application No. 18169911.7, dated Feb. 1, 2022, 6 pages.
United States Patent and Trademark Office, "Notice of Allowance," issued in connection with U.S. Appl. No. 15/493,611, dated Feb. 7, 2022, 5 pages.

(56) References Cited

OTHER PUBLICATIONS

European Patent Office, "Communication pursuant to Article 94(3) EPC," issued in connection with European Patent Application No. 17179223.7, dated Feb. 11, 2022, 5 pages.
United States Patent and Trademark Office, "Corrected Notice of Allowance," issued in connection with U.S. Appl. No. 15/493,611, dated Feb. 15, 2022, 2 pages.
European Patent Office, "Notice of Intention to Grant," issued in connection with European Patent Application No. 17179224.5, dated Feb. 28, 2022, 7 pages.
United States Patent and Trademark Office, "Restriction Requirement," issued in connection with U.S. Appl. No. 16/724,807, dated Mar. 9, 2022, 6 pages.
Chinese Patent Office, "Decision on the Re-examination," issued in connection with Chinese Patent Application No. 201810418245.4, dated Mar. 14, 2022, 1 pages.
Japanese Patent Office, "Decision to Grant a Patent," issued in connection with Japanese Patent Application No. 2019-224437, dated Mar. 7, 2022, 5 pages (English translation provided).
IP Australia, "Notice of acceptance," issued in connection with Australian Patent Application No. 2020260545, dated Mar. 24, 2022, 3 pages.
IP Australia, "Notice of Acceptance," issued in connection with Australian Patent Application No. 2021200734, dated Mar. 29, 2022, 3 pages.
China National Intellectual Property Administration, "First Office Action," issued in connection with Chinese Patent Application No. 202010985725.6, dated Mar. 2, 2022, 19 pages (English translation provided).
European Patent Office, "Extended European Search Report," issued in connection with European Patent Application No. 21191918.8, dated Jan. 7, 2022, 8 pages.
Canadian Intellectual Property Office, "Notice of Allowance," issued in connection with Canadian Patent Application No. 3094309, dated Apr. 28, 2022, 1 page.
China National Intellectual Property Administration, "Notification to Grant Patent Right for Invention," Issued in connection with Chinese Patent Application No. 202010379486.x, dated May 11, 2022, 6 pages.
China National Intellectual Property Administration, "Notification to Grant Patent Right for Invention," Issued in connection with Chinese Patent Application No. 201810418245.4, dated May 19, 2022, 6 pages.
IP Australia, "Examination Report No. 1," issued in connection with Australian Patent Application No. 2021212146, dated Jun. 10, 2022, 3 pages.
Japanese Patent Office, "Decision to Grant Patent," issued in connection with Japanese Patent Application No. 2021-019730, dated Jun. 20, 2022, 4 pages (English translation included).
Kenyon City Grill Owners Manual Mar. 28, 2011.
Meco Corp. 9300 Series Electric Barbecue Grill Owner's & Operator's Manual May 1999.
Stok Operator's Manual Electric Gridiron Grill STE1150Q Jan. 22, 2014.
TEFAL EasyGrill Contact CB901012.
Dimplex North America Ltd. Power Chef Electric Grill TBQ-120 Owner's Manual 2010.
Dimplex North America Ltd. Power Chef Convertible Electric Grill CBQ0120-ELE/ELEM.
Extended European Search Report dated Feb. 9, 2018 in corresponding European Application No. 17179224.5.

Examination Report No. 1 issued Feb. 27, 2018 in corresponding Australian Application No. 2017204389.
First Office Action and Search Report issued Jun. 5, 2018 in corresponding Chinese Application No. 201710521776.1.
First Office Action issued Jun. 5, 2018 in corresponding Japanese Application No. 2017-128814.
Extended European Search Report dated Oct. 4, 2018 in corresponding European Application No. 18169911.7.
Examination Report No. 1 dated Oct. 2, 2018 in corresponding Australian Application No. 2018202490.
Office Action dated Jun. 25, 2019 in corresponding Japanese Application No. 2018-085657.
Office Action dated Jun. 25, 2019 in corresponding Japanese Application No. 2018-154680.
Office Action dated Sep. 20, 2019 in corresponding Chinese Application No. 201810418245.4.
IP Australia, "Examination Report No. 1," issued in connection with Australian Patent Application No. 2017204387, Jun. 29, 2018, 3 page.
Japanese Patent Office, "Decision to Grant a Patent," issued in connection with Appl. No. 2017-033144, Aug. 7, 2018, 5 pages.
Canadian Intellectual Property Office, "Office Action", issued in connection with Canadian Patent Application No. 3,000,542, Mar. 28, 2019, 2 pages.
Japanese Patent Office, "Written Opinion," issued in connection with Appl. No. 2019-085656, Mar. 31, 2019, 6 pages.
European Patent Office, "Communication pursuant to Article 94(3) EPC," issued in connection with European Patent Application No. 17179223.7, dated Jul. 1, 2020, 5 pages.
Patent Cooperation Treaty, "International Search Report," issued in connection with PCT No. PCT/JP2021/019730, Aug. 17, 2021, 2 pages.
European Patent Office, "Partial European Search Report," issued in connection with European patent appl. No. 22180377, Jan. 17, 2023, 4 pages.
Australian Government, IP Australia, "Notice of Grant," issued in connection with AU Application No. 2021212146, issued on Mar. 9, 2023, 1 page.
United States Patent and Trademark Office, "Corrected Notice of Allowability", issued in connection with U.S. Appl. No. 16/724,807, filed Apr. 5, 2023, 2 pages.
China National Intellectual Property Administration, "Decision of Final Rejection," issued in connection with Chinese Patent Application No. 202010985725.6, dated Apr. 29, 2023, 14 pages. [English language machine translation included.].
United States Patent and Trademark Office, "Non-Final Office Action", issued in connection with U.S. Appl. No. 17/895,806, filed May 22, 2023, 7 pages.
United States Patent and Trademark Office, "Corrected Notice of Allowability", issued in connection with U.S. Appl. No. 16/724,807, filed Jun. 9, 2023, 2 pages.
European Patent Office, "Communication pursuant to Article 94(3) EPC," issued in connection with European Patent Application No. 18169911.7-1202, mailed on Jul. 27, 2023, 5 Pages.
United States Patent and Trademark Office, "Notice of Allowance," issued in connection with U.S. Appl. No. 17/895,806, mailed on Aug. 23, 2023, 5 pages.
United States Patent and Trademark Office, "Requirement for Restriction / Election," issued in connection with U.S. Appl. No. 18/327,729, dated Mar. 7, 2024, 6 pages.
United States Patent and Trademark Office, "Notice of Allowance and Fee(s) Due," issued in connection with U.S. Appl. No. 18/327,729, dated May 15, 2024, 9 pages.

* cited by examiner

DIGITAL POWER SUPPLY

This patent application is a divisional of U.S. patent application Ser. No. 15/200,759, filed on Jul. 1, 2016, currently pending and allowed. Its disclosure is hereby expressly incorporated, in its entirety, by reference as part of the present disclosure as if fully set forth herein.

FIELD OF THE INVENTION

The present inventions relate to a digital power supply for independently controlling two or more high-powered loads with reduced harmonic and flicker introduction. In a non-limiting embodiment, a digital power supply may be used in an electric grill to independently control two or more heating elements while reducing harmonics and flicker introduced to the power system.

BACKGROUND OF THE INVENTIONS

There is an increasing desire for a power supply that can independently control two or more high-powered loads using an AC wall outlet while introducing a reduced amount of harmonics and/or flicker into the power grid. The urban population is increasing, and with it there is an increasing desire for high powered loads that can be plugged into an AC wall outlet. By way of example, urban dwellers live in apartment or condominium buildings where they would like to use a grill. Because of smoke, gas, or other concerns, use of typical charcoal or gas grills may not be permitted or desirable.

There are a number of available electric cooking devices, such as the George Foreman Plate Grill (and similar devices), Panini presses, electric griddles and the like. However, these prior art devices generally do not deliver variable power. Moreover, these prior art electric cooking devices typically cannot generate enough power to match a gas or electric grill.

Some prior art devices may use variable resistors in series with electric loads to control an amount of power delivered to the load. For example, as the resistance of a variable resistor increases, the variable resistor restricts power from being delivered to an electric load. The use of variable resistors to control power delivery to electric loads is well known. But variable resistors come with disadvantages. For example, disadvantages may include the introduction of harmonics onto the electrical system, which translates to electromagnetic emissions that can create interference and other unpredictable electromagnetic fields. Moreover, variable resistors may be inefficient because they burn a lot of power.

Other prior art devices may use a bi-metal thermometer which opens and closes to control power delivery. Disadvantages of using a bi-metal thermometer include the fact that it allows for less discrete (i.e., less precise) control over power delivered and is usually associated with a relatively long lag in response time. A long lag time causes a negative cooking experience because it leads to poor control over temperature. Moreover, a long lag time is disadvantageous because long on/off duty cycles are known to shorten the life span of a heating element Some devices may use half-wave control techniques to deliver power. For example, U.S. Pat. No. 6,772,475, titled "Heating Control System Which Minimizes AC Power Line Voltage Fluctuations," discloses half wave AC control devices to control delivery of AC current. This control method is associated with significant disadvantages because it delivers power only in stages, not in a continuous range from 0-100%. By contrast, embodiments of the present invention allow continuous variable power delivery.

Yet other prior art devices may include a digital control for limiting the in-rush of electric current when an electric load in turned on. For example, U.S. Pat. No. 6,111,230, titled "Method and apparatus for supplying AC power while meeting the European flicker and harmonic requirements," describes a method for limiting the in rush of current to a printing device when it is first turned on. However, the disclosed devices do not provide for independently controlling multiple electric loads, much less for reducing harmonic currents and flicker while independently controlling multiple loads.

Thus, there is a need for a digital power supply that can independently control two or more electric loads while introducing only reduced harmonic and flicker interference to the power system.

BRIEF SUMMARY OF THE INVENTIONS

The present inventions overcome many of the deficiencies of known power supplies and provide new features and advantages for devices such as electric grills. For example, embodiments of the present invention provide digital power controls that can deliver more precise amounts of power to electric loads. Moreover, embodiments of the present invention allow a plurality of electric loads to be controlled independently. Yet further embodiments of the present invention reduce the harmonic currents and flicker that may result from plugging a power supply into a wall outlet.

In accordance with a preferred embodiment of the present invention, a method of delivering power is provided. The method may include the steps of using one or more user input devices to select a first and second power setting for a first and second heating element, respectively; electronically communicating the power settings to a microprocessor and using the microprocessor to calculate a total amount of power requested; using the microprocessor to populate a first and second power array corresponding to the first and second heating element, respectively; using the microprocessor to calculate a first and second phase angle array corresponding to the first and second power array; causing the microprocessor to receive a zero crossing signal from a zero crossing detection unit; and for a first time period, delivering a phase-controlled AC wave pattern represented by the first phase angle array to the first heating element and delivering a phase-controlled AC wave pattern represented by the second phase angle array to the second heating element. Additional embodiments of the inventions comprise the step of, for a second time period, delivering a phase-controlled AC wave pattern represented by the first phase angle array to the second heating element and delivering a phase controlled AC wave pattern represented by the second phase angle array to the first healing element.

Further, each power array may contain four cells. Additionally, the step of using the microprocessor to populate a first and second power array may further comprise the steps of populating the first cell of the first power array with the same value as the third cell of tire first power array; populating the second cell of the first power array with the same value as the fourth cell of the first power array; populating the first cell of the second power array with the same value as the third cell of the second power array; and populating the second cell of the second power array with the same value as the fourth cell of the second power array.

In embodiments of the inventions, each cell of each power array represents a power percentage and ranges from $0 \leq x \leq 1.0$. Every alternate cell in the first power array may be populated with a "0" or a "1". Moreover, every alternate cell in the second power array may be populated with a "0" or a "1". In some embodiments of the inventions, the first and second phase angle arrays are calculated using the microprocessor to apply the equation angle=arc $\cos(2x-1)$ to the first and second power array, respectively. In further embodiments, the first time period is calculated as a ratio of the first power setting to the total amount of power requested and the second time period is calculated as a ratio of the second power setting to the total amount of power requested. Further, embodiments may include the step of activating a triac connected to a heating element.

Also provided are embodiments of a digital power supply, having a first and second user input; a first and second triac connected to a voltage line; a first and second triac driver respectively in communication with the first and second triac; a microprocessor in communication with the first and second triac drivers and in communication with the first and second user input; wherein the microprocessor is specifically configured to calculate a total power requested by the first and second user inputs and to populate a first and second power array based on the total power requested; and wherein the microprocessor is specifically configured to calculate a first and second array of phase angles based on the respective values of the first and second power array.

In embodiments of the invention the first and second power array each have four cells. The microprocessor may be specifically configured to populate at least one power array's cells with two alternating values. In further embodiments, the microprocessor may be configured turn on the first and second triacs in a timing pattern that corresponds to a phase-controlled wave form in die first and second phase angle arrays.

Still further embodiments include an electric grill, having a first knob, a second knob, and a display mounted on a housing; a power cable connected to a voltage line and a neutral line; a first and second heating element inside the housing, the first and second heating elements being connected to the voltage line and the neutral line; a first and second triac connected between the voltage line and the first and second heating elements respectively; a first and second triac driver respectively in communication with the first and second heating elements; a zero crossing detection unit configured to detect zero crossings of AC current in the voltage line; and a microprocessor in communication with the first and second knob, the first and second triac drivers, and the zero crossing detection unit, wherein the microprocessor further communicates with a clock signal generator and a memory.

Moreover, in some embodiments the memory contains a first and second power array. The first power array may be populated with two alternating values. The second power array may be populated with two alternating values. One of the two alternating values in the first power array may represent a full "on" wave. In yet further embodiments, one of the two alternating values in the first power array may represent a full "off" wave.

Accordingly, it is an object of the present invention to provide a digital power supply that provides precise power control, may independently control multiple loads, and may reduce harmonic currents and flicker introduced by the power supply into a wall outlet.

Another object of the invention is to provide an improved power supply, including but not limited to one that may be used with an electric grill.

It is an additional object of the invention to provide a digital power supply that can be used in an electric grill to provide independent control over two or more healing elements.

It is an additional object of the invention to provide a digital power supply that introduces fewer harmonic currents into a wall outlet.

It is an additional object of the invention to provide a digital power supply that introduces less flicker into a wall outlet.

It is an additional object of the invention to provide a digital power supply for use in an electric grill that complies with standard limits and/or regulations on harmonic currents and flicker.

It is an additional object of the invention to provide a digital power supply for use in an electric grill to deliver variable power to two or more heating elements.

It is an additional object of the invention to provide a digital power supply that uses phase cutting techniques to deliver variable power.

It is an additional object of the invention to provide a digital power supply that delivers continuous variable power in a range of 0-100%.

It is an additional object of the invention to improve a heating element's life span by providing short duty cycles.

INVENTORS' DEFINITION OF TERMS

The following terms which may be used in the various claims or specifications of this patent are intended to have their broadest meaning consistent with the requirement of law:

As used herein, a "power array" is defined to be an array of values, each value representing a percentage ($0.0 \leq x \leq 1.0$) of power delivery in one wave cycle. Exemplary power arrays are described as having four cells, but it should be understood that arrays of other sizes are possible.

As used herein, a "phase angle array" is defined to be an array of values, each value representing the phase angle "cut" in one wave cycle. Exemplary phase angle arrays have four cells, but it should be understood that arrays of other sizes are possible.

As used herein, a "timing pattern" is defined to be a pattern of "on" and "off" signals that create phase-controlled AC wave forms.

Where alternative meanings are possible, in either the specifications of claims, the broadest meaning is intended consistent with the understanding of a person of ordinary skill in the art. All of the words used in the claims are intended to the use in the normal, customary usage of grammar, the trade and the English language.

DRAWINGS

DETAILED DESCRIPTION OF THE PREFERRED EMBODIMENTS

Figure 1A:
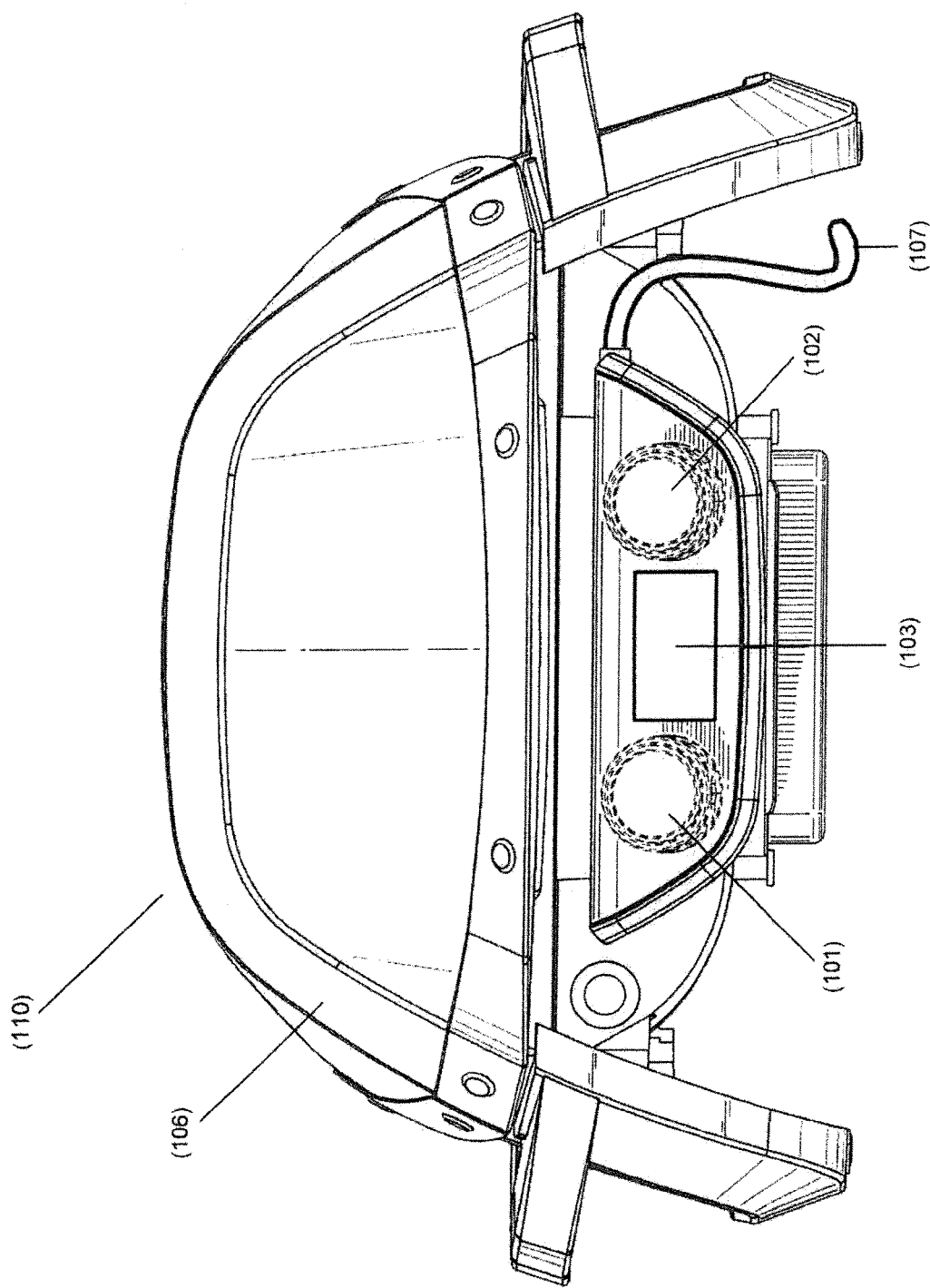
FIG. 1A is a front view of an exemplary grill of the present invention.

Set forth below is a description of what is currently believed to be the preferred embodiments or best representative examples of the inventions claimed. Future and present representative or modifications to the embodiments and preferred embodiments are contemplated. Any alterations or modifications which make insubstantial changes in function, purpose, structure or result are intended to be covered by the claims of this patent. The present inventions may be used on and/or part of electric grills with current protection circuitry as discussed in the co-pending patent application entitled "Electric Grill With Current Protection Circuitry" filed by Applicants on the same day as this application and assigned to Weber-Stephen Products LLC, and which is incorporated herein by reference in its entirety.

The present inventions generally include a digital power supply that can provide independent power control, and continuous variable power, for two or more electrical loads. Embodiments of the present inventions may reduce the amount of harmonics and/or flicker introduced into a power system. A person of ordinary skill in the art would recognize that the digital power supply may be used to supply any electrical load or combinations of loads, including heaters, motors, and the like. In a preferred embodiment described herein, exemplary loads are heating elements found in an electric grill.

Electric grills are a suitable application for a digital power supply with independent load control because a user may wish to have higher heat on one side of an electric grill and lower heat on the other side of the grill. Such an arrangement allows a user to simultaneously grill various foods requiring different temperatures, or to use indirect grilling methods. Examples of indirect grilling methods include placing foods on one side of a cooking surface while heating another side, thereby avoiding direct contact between the food and the heat source. A further benefit of variable power is that it allows a user to input a power setting and achieve targeted temperatures. This makes it possible to cook at low temperatures for prolonged periods of time.

Referring now to the drawings, FIGS. 1-11 show preferred embodiments of an electric grill 110 and a digital power supply 200. By way of example, FIGS. 1A and 1B show an electric grill 110. FIG. 1A shows the exterior of electric grill 110, including a housing 106, onto which left and right control knobs 101 and 102, as well as display 103, may be mounted. The electric grill 110 may include a power cord 107 for connecting to an AC wall outlet. Left and right control knobs 101 and 102, and display 103, may connect to a microcontroller 213 which is described in greater detail herein.

Figure 1B:
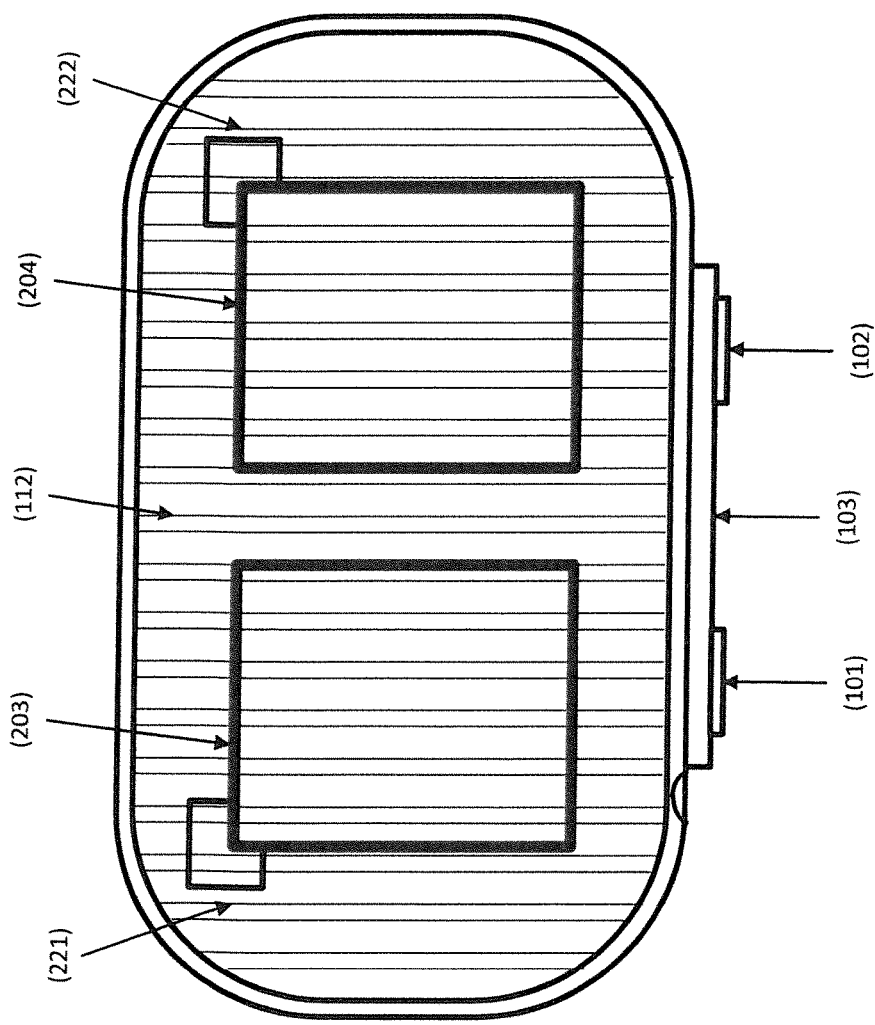
FIG. 1B is a top schematic view of a cooking surface of a representative grill showing representative internal components.

As shown in FIG. 1B, left and right control knobs 101 and 102 may be associated with a first and second heating element, 203 and 204, respectively, thus creating dual cooking zones. A representative grate or cooking surface 112 is also shown in FIG. 1B. Each heating element 203 and 204 may be controlled independently by a knob 101, 102 or any other controller associated with the heating element 203, 204. Left knob 101 and right knob 102 may be positioned on the exterior of a grill housing 106. The knobs 101 and 102, or any other input device that will be understood by those of skill in the art, may be connected to a microprocessor 213 to set the operating mode of one or more heating elements 203, 204.

Using knobs 101 and 102, or any other input device such as a touch screen or buttons, a user may select an operating mode for each heating element 203 and 204. The operating mode may include a desired temperature or power setting for the heating element. Microprocessor 213, described in further detail herein, controls the electric current delivered to heating elements 203 and 204 in order to deliver the selected power. Microprocessor 213 can achieve a desired temperature for each heating element 203 and 204 using a feedback loop in which it receives a current temperature reading from thermocouples 221 and 222, which are proximally positioned by respective heating elements 203 and 204. A person of ordinary skill in the art would recognize that various types and numbers of knobs, heating elements, temperature sensors and/or displays may be used.

The electric grill 110 may optionally include a display 103 or other user interface. In one example the display 103 may be connected to microprocessor 213 and display information relating to the current settings or operation of one or more of the heating elements 203, 204. For example, the display 103 may show the current temperature in the proximity of heating elements 203 and 204 (as measured by thermocouples 221 and 222), as well as the desired temperature or power setting a user has selected via knobs 101 and/or 102.

Figure 2:
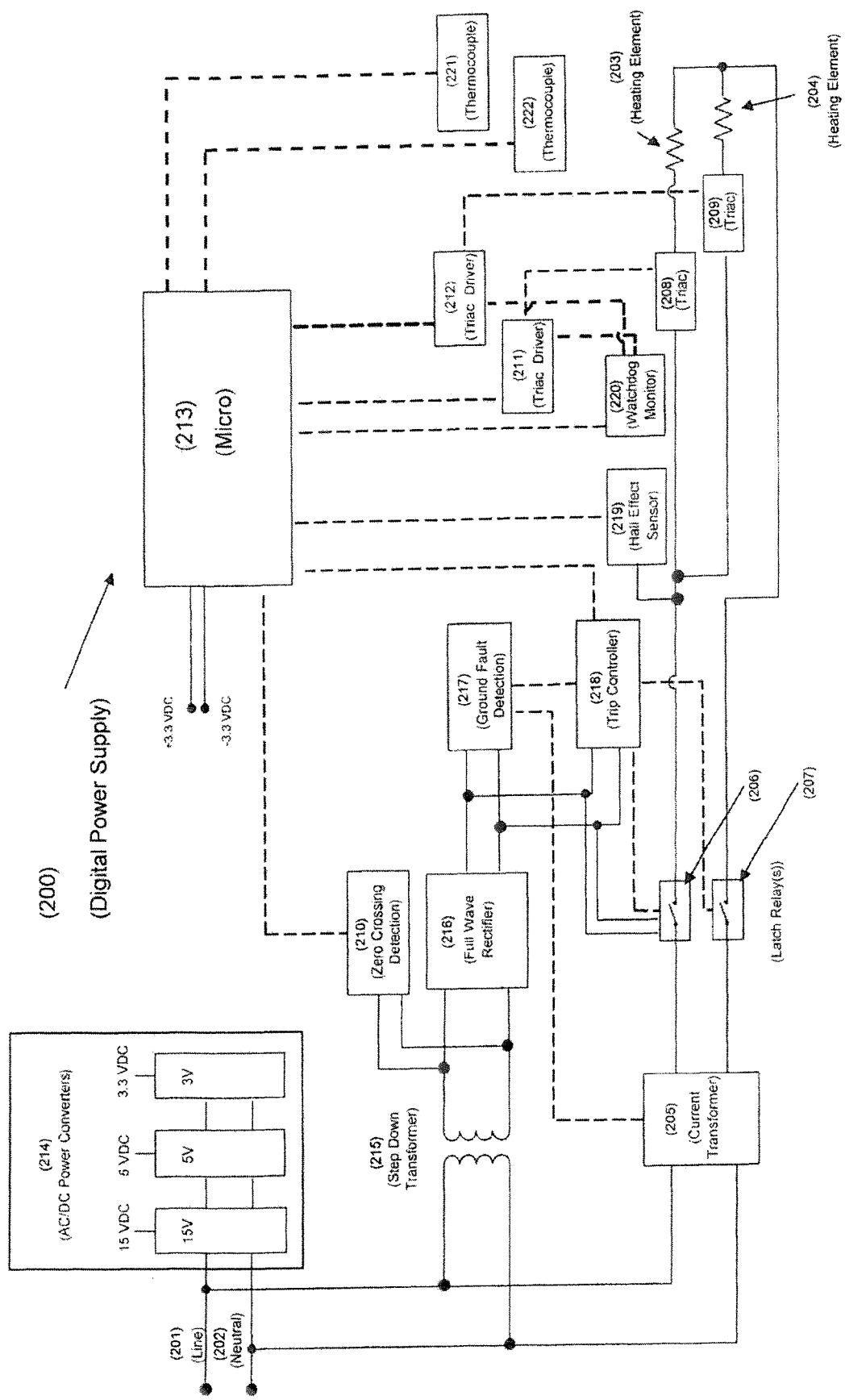
FIG. 2 is a schematic of an exemplary embodiment of a circuit, including a digital power supply circuit of the present invention.

Turning now to FIG. 2, in general, non-limiting terms, digital power delivery may be accomplished by a microprocessor 213 which receives a user's desired power setting(s) and controls triacs 208 and 209 to enable (or disable) AC current to flow from voltage line 201 through heating elements 203 and 204 and return to a wall outlet through neutral 202. Additionally provided herein is a specifically configured microprocessor 213 which may control the flow of AC current to the heating elements 203 and 204 in a manner that reduces the amount of harmonic current and flicker introduced by the electric grill 110 to the AC wall outlet.

As shown in the embodiment of FIG. 2, microprocessor 213 is in communication with triac drivers 211 and 212, which in turn control respective triacs 208 and 209. The mechanism by which microprocessor 213 may deliver power to heating elements 203 and 204 is by turning triacs 208 and 209 on or off (sometimes referred to as "enabled" and "disabled" respectively) via their corresponding triac drivers 211 and 212.

Specifically, triacs 208 and 209 turn "on" when they are triggered by a pulse from microprocessor 213. Current continues to flow until an AC current wave crosses zero. After a zero crossing, a triac turns off and remains off until the next time microprocessor 213 turns it on. In an example where AC current is 60 Hz, such as a typical wall outlet, a zero crossing occurs every $\frac{1}{120}^{th}$ of a second. A zero crossing detection unit 210 is provided to communicate a signal to microprocessor 213 each time an AC wave crosses zero. Using this signal, microprocessor 213 can synchronize its timing to the alternating current's zero crossings.

Instead of permitting direct communication between microprocessor 213 and triacs 208 and 209, triac drivers 211 and 212 are used to interface between microprocessor 213 and triacs 208 and 209. Triac drivers can control a high voltage triac with a low voltage DC source (such as a microprocessor) (FIG. 2). Moreover, triac drivers arc used to isolate devices from a potentially high current or voltage in a triac. Triac drivers 211 and 212 interface between microprocessor 213 and triacs 208 and 209 while at the same time keeping microprocessor 213 isolated from voltages and currents in triacs 208 and 209.

An "on" triac allows current to flow through it, whereas an "off" triac docs not allow current to flow. Thus, an "on" triac 208 permits AC current to flow (from voltage line 201) through first heating element 203 and an "on" triac 209 permits AC current to flow (from voltage line 201) through second heating element 204. To say that microprocessor 213 delivers power to a heating element 203 and/or 204 implies that microprocessor 213 enables the respective triac driver, which turns the relevant triac "on" and allows AC current to flow from line 201. Throughout this disclosure, it should be understood that references to microprocessor 213 delivering power to a heating element mean that microprocessor 213 is activating a given heating element's triac Driver via an "on" or "enable" pulse signal.

As a person of ordinary skill would understand, triacs are three electrode devices, or triodes, that conduct alternating current. Triacs are a type of solid state bidirectional switch. Although this disclosure describes a digital power supply that uses triacs, it should be understood that any solid state bidirectional switch may be used instead of a triac. Healing elements 203 and 204 may be resistive heaters which increase in temperature as more current passes through them. Exemplary heating elements may draw 1150 Watts. Other heating elements 203, 204 may also be used as will be understood by those of skill in the art.

In embodiments of the invention, microprocessor 213 may optionally receive temperature feedback from one or more thermocouples 221 and 222 located proximately to each heating element 203 find 204 in order to recognize when a desired temperature has been achieved. FIG. 1B shows an example of thermocouples 221 and 222 adjacent to each heating element 203 and 204. In an embodiment the feedback may be used by microprocessor 213 to adjust the current delivered to the heating elements 203 and 204 until the desired temperatures selected by knobs 101 and/or 102 is achieved. As a result, a user can (independently) select a desired operating mode for heating elements 203 and 204. In embodiments of the invention, microprocessor 213 may control the current delivered until a desired temperature setting is reached and then maintain the desired temperature.

Turning next to the operation of microprocessor 213, microprocessor 213 may be configured to deliver an appropriate amount of power (as selected by the user) by toggling triacs 208 and 209 between "on" and "off." As described above, an enabled (or "on") triac 208 or 209 allows AC current to flow from line 201 through heating elements 203 or 204, respectively. Therefore it follows that a longer "on" period allows more AC current to flow and therefore delivers more power. Conversely, a longer "off" period results in lower power delivery.

In embodiments of the invention, microprocessor 213 may use phase angle control techniques to create a pattern of toggling between "on" and "off." The control pattern created by toggling between "on" and "off" controls the phase angle of AC current (and by extension, power) flowing from voltage line 201 through heating elements 203 and 204. This type of control pattern is sometimes referred to as "phase cutting," because AC current's wave forms may be "cut" off. Waves are cut by disabling the flow of current during part of an AC wave cycle. In this way, pan of the wave becomes "cut" off. The timing pattern of "on" and "off" creates a phase-controlled wave. To determine the correct angle at which to cm a wave for a desired power delivery, microprocessor 213 solves the equation:

$$(\text{angle}) = \text{arc } \cos(2x-1)$$

where x is the desired power delivery (expressed as a percentage: $0.0 \leq x \leq 1.0$). Microprocessor 213 is programmed to solve for the angle at which to cut the AC sine wave delivered to heating elements 203 and 204. This disclosure refers to angles in "degrees," but a person of skill in the art would understand that every angle measurement may be converted into the unit "radians."

Figure 3A:
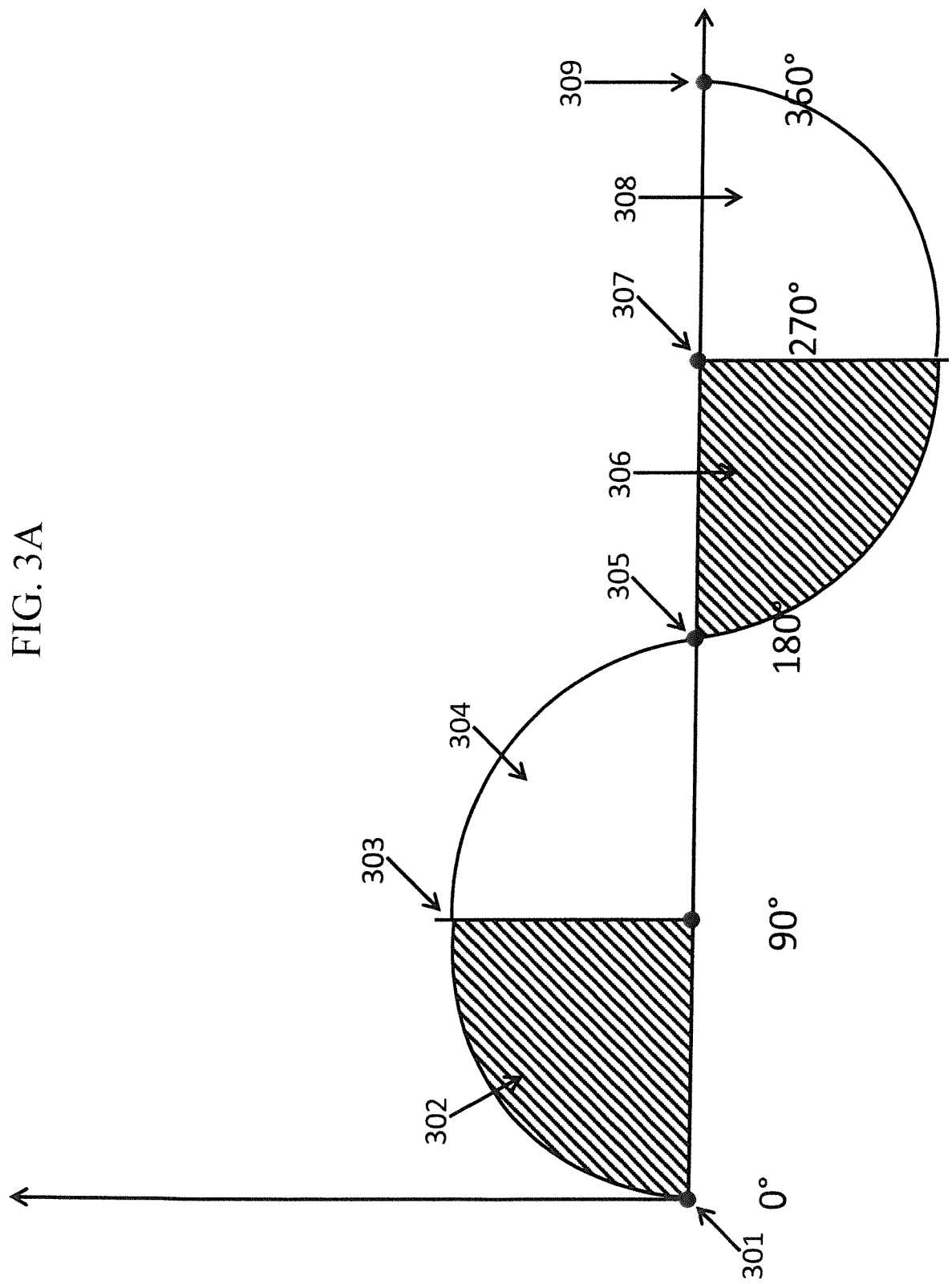
FIG. 3A is an exemplary wave form with a 90 degree cut of the present invention.

An example is provided in FIG. 3A, which illustrates an example where microprocessor 213 cuts an AC wave at 90°. A 90° cut produces a wave that delivers half (i.e. 50%) of the total available power. FIG. 3A shows one wave cycle of an AC current. A person of skill in the art would understand that a complete wave has a positive half and a negative half. The wave cycle begins at 301 where the current's value is zero. The area between 301 and 303, numbered 302 is shaded gray to indicate a triac is not enabled and therefore current is not being delivered. At 303, which represents a 90° phase angle, microprocessor 213 sends a pulse signal to activate a triac and thus allow current to flow through a heating element. (Stated differently, microprocessor 213 begins delivering power at 303). At 305, current crosses zero and the triac turns off. The triac remains off until 307, which represents a 270° phase angle. At 270°, microprocessor 213 again sends an activating pulse and current flows for a 90° phase, between 307 and 309, i.e. from 270° to 360°.

Figure 3B:
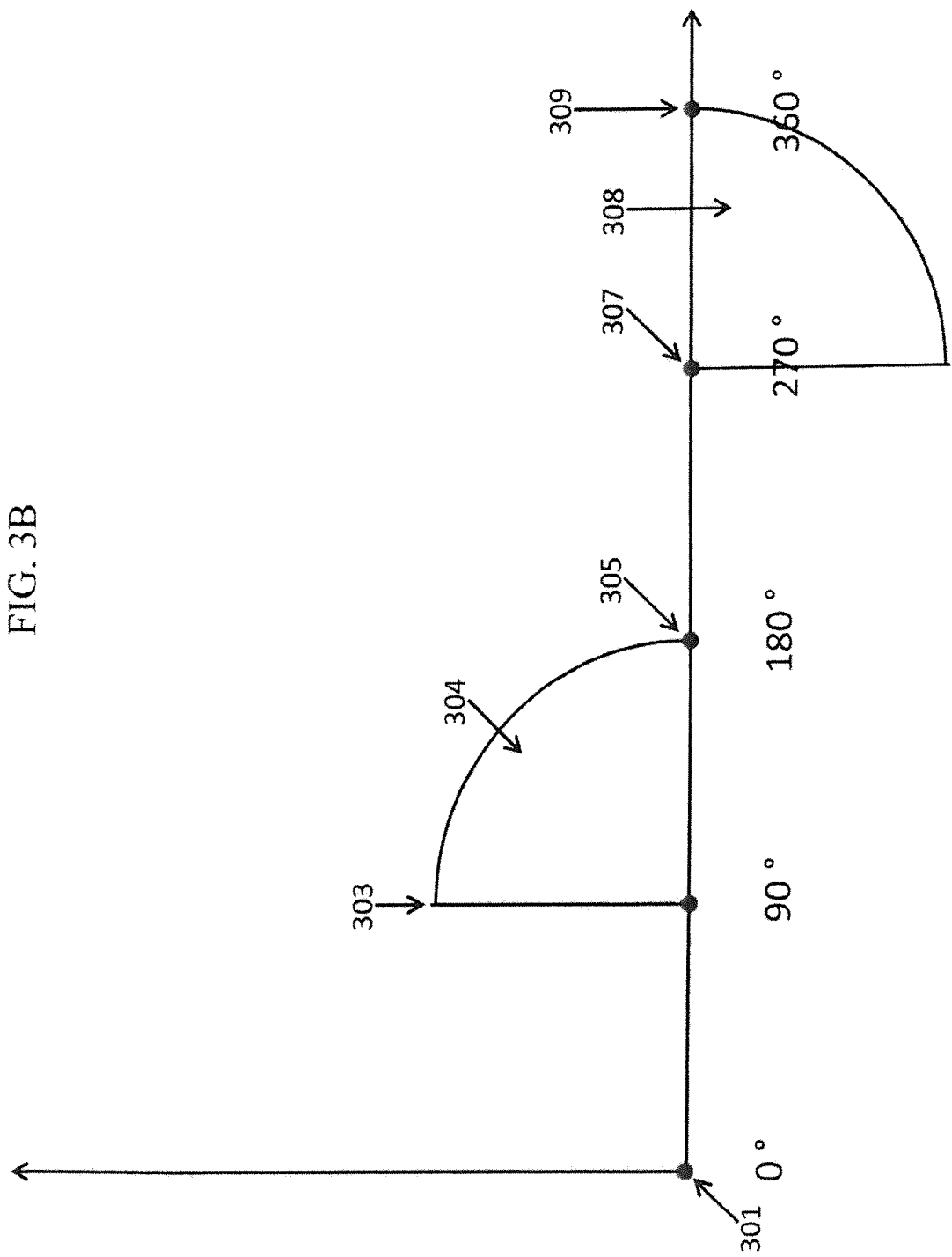
FIG. 3B is an exemplary wave form with a 90 degree cut of the present invention.

In sum, FIG. 3A shows microprocessor 213 delivering power for the areas marked 304 and 308, each representing 90° phases, for a combined 180°. No power is delivered for the shaded areas marked 302 and 306, also representing 90° each, for a combined 180°. In this way, microprocessor 213 has delivered half, or 50%, of the power that was available. To deliver a different power percentage, microprocessor 213 may send an activating pulse earlier in a half-wave to deliver more power, or later in a half wave to deliver less power. For any desired power percentage, the appropriate phase angle cut may be calculated by microprocessor 213 solving for $(\text{angle}) = \text{arc } \cos(2x-1)$. In the example of FIG. 3A, a 50% power deliver was selected. Therefore, microprocessor 213 executed the calculation (phase angle)=arc cos(2*0.5−1)= 90°. FIG. 3B removes the "cut off" wave portions of FIG. 3A and shows only the power actually delivered.

Figure 3C:
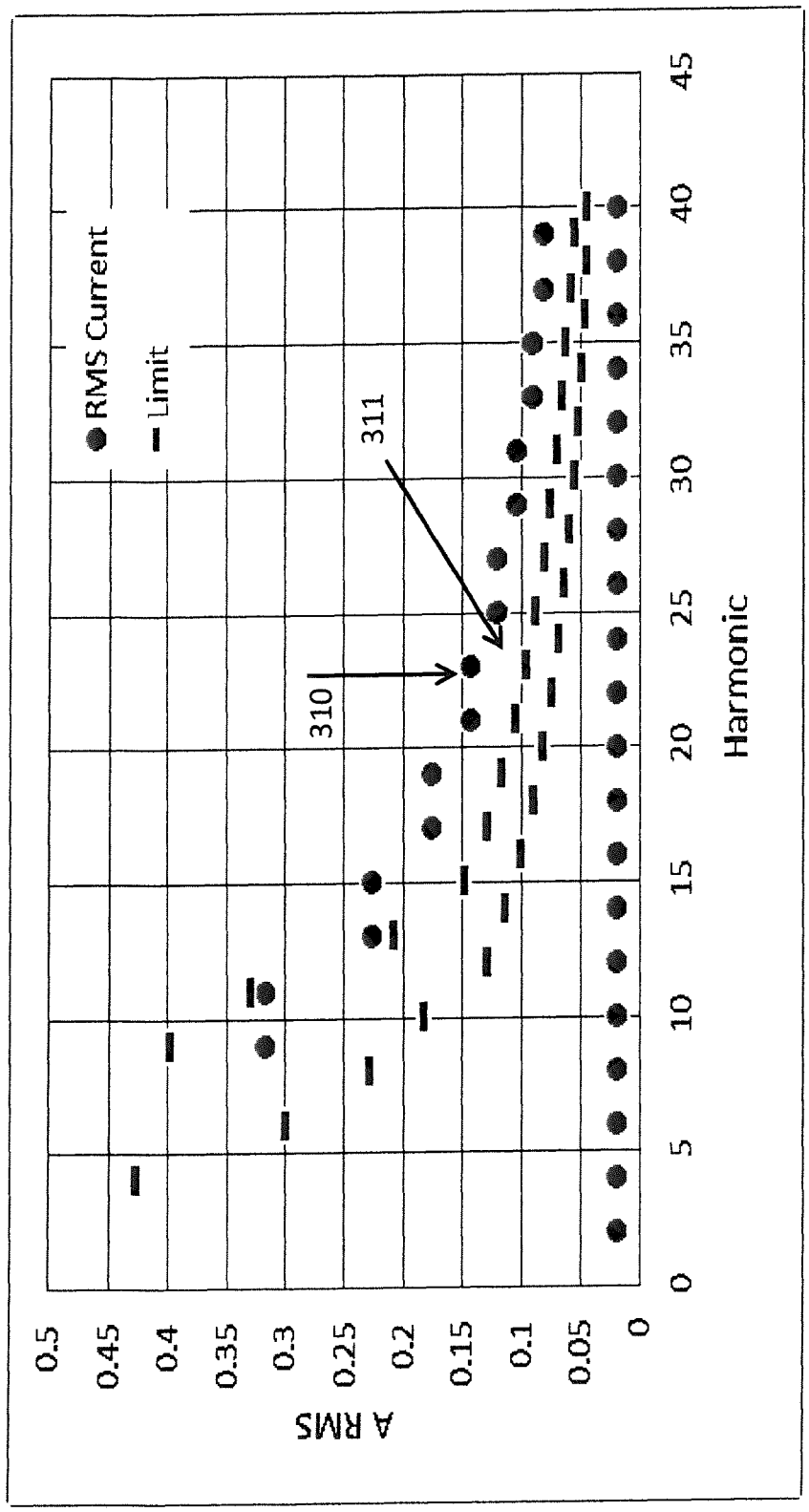
FIG. 3C shows harmonic currents plotted against standard limits showing harmonic currents by a 1150W element.

Turning now to FIG. 3C, a graph is provided which shows the harmonic currents introduced into a power system by a 90° phase cut described in FIGS. 3A and 3B. In other words, these plotted harmonic currents may be introduced into a building's power lines when an electric grill is plugged into a wall outlet and makes the 90° phase cut described in FIGS. 3A/3B. The plot is made using a 1150W heating element. Introducing harmonics is undesirable because it leads to electromagnetic interference. Moreover, there are standards, such as IEC 61000-3-2 *Electromagnetic compatibility (EMC)—Part* 3-2, which limit the level of harmonic currents that may be introduced into a wall outlet by a device. The harmonic current limits are plotted as line segments in the graph of FIG. 3C. As will be clear from FIG. 3C, the harmonic currents (plotted as points) introduced by the 90° phase cut exceed the harmonic limits (plotted as line segments). In other words, the graph in FIG. 3C shows that the points (representing the RMS current) are higher than the lines which mark the harmonic limits. This means that the wave forms of FIGS. 3A/3B have high harmonic currents and do not comply with the IEC standard. For example, RMS current at point 310 is one example of a harmonic current that exceeds (i.e., is above) the harmonic limit 311.

Figure 4A:
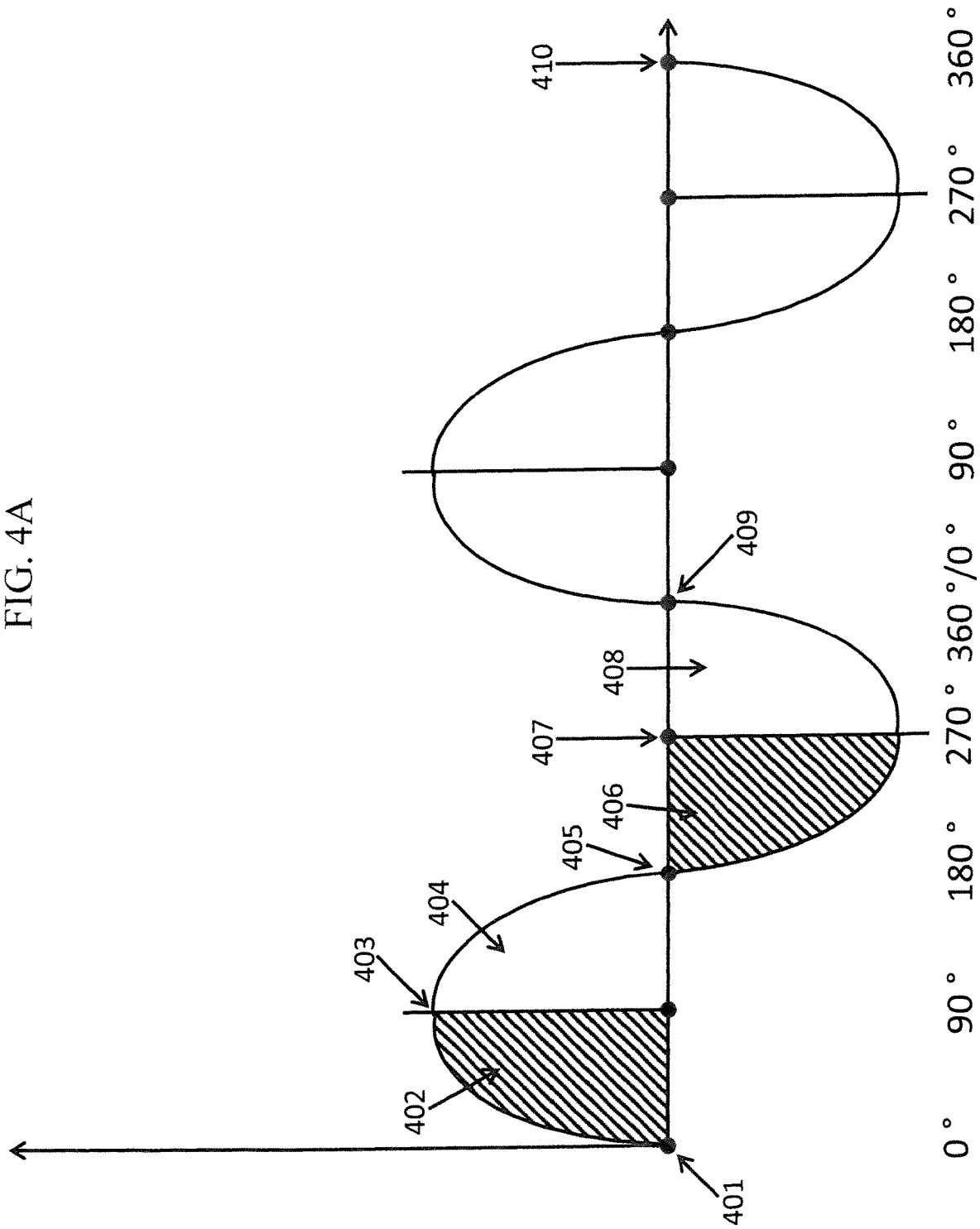
FIG. 4A is an exemplary cut wave form followed by an "on" wave of the present invention.
Figure 4B:
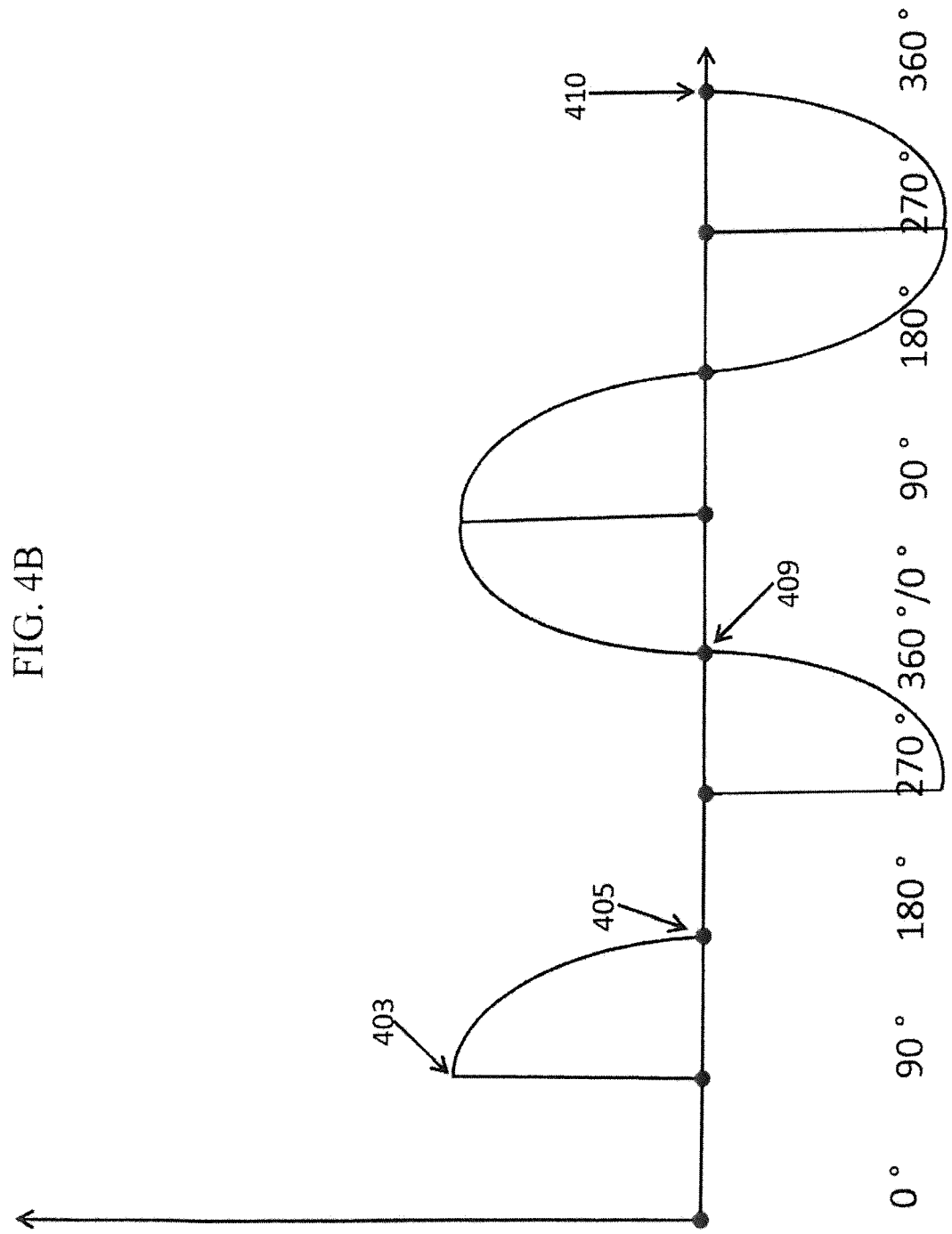
FIG. 4B is an exemplary cut wave form followed by an "on" wave of the present invention.
Figure 4C:
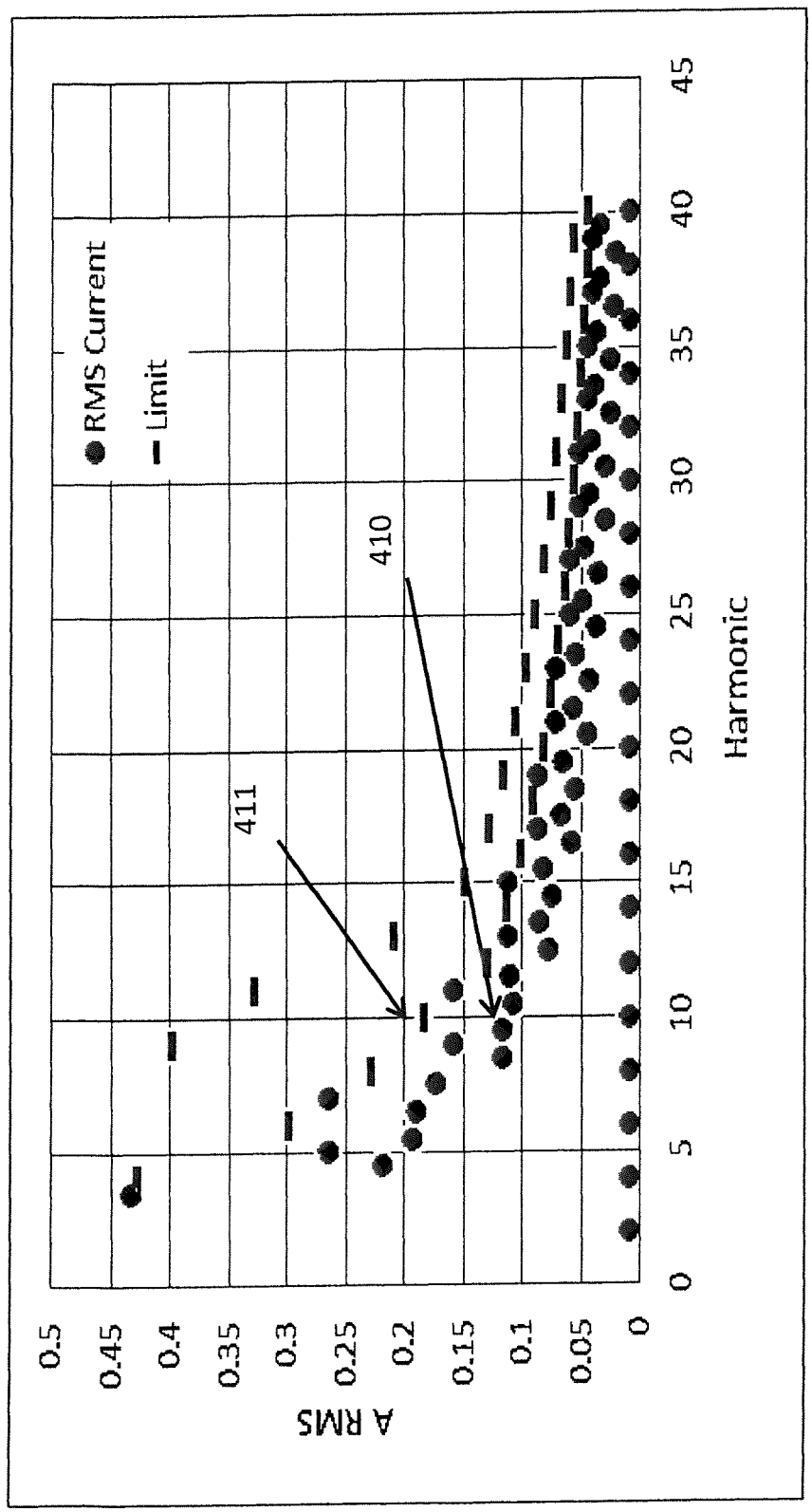
FIG. 4C shows harmonic currents plotted against standard limits showing harmonic currents by a 1150W element.
Figure 5A:
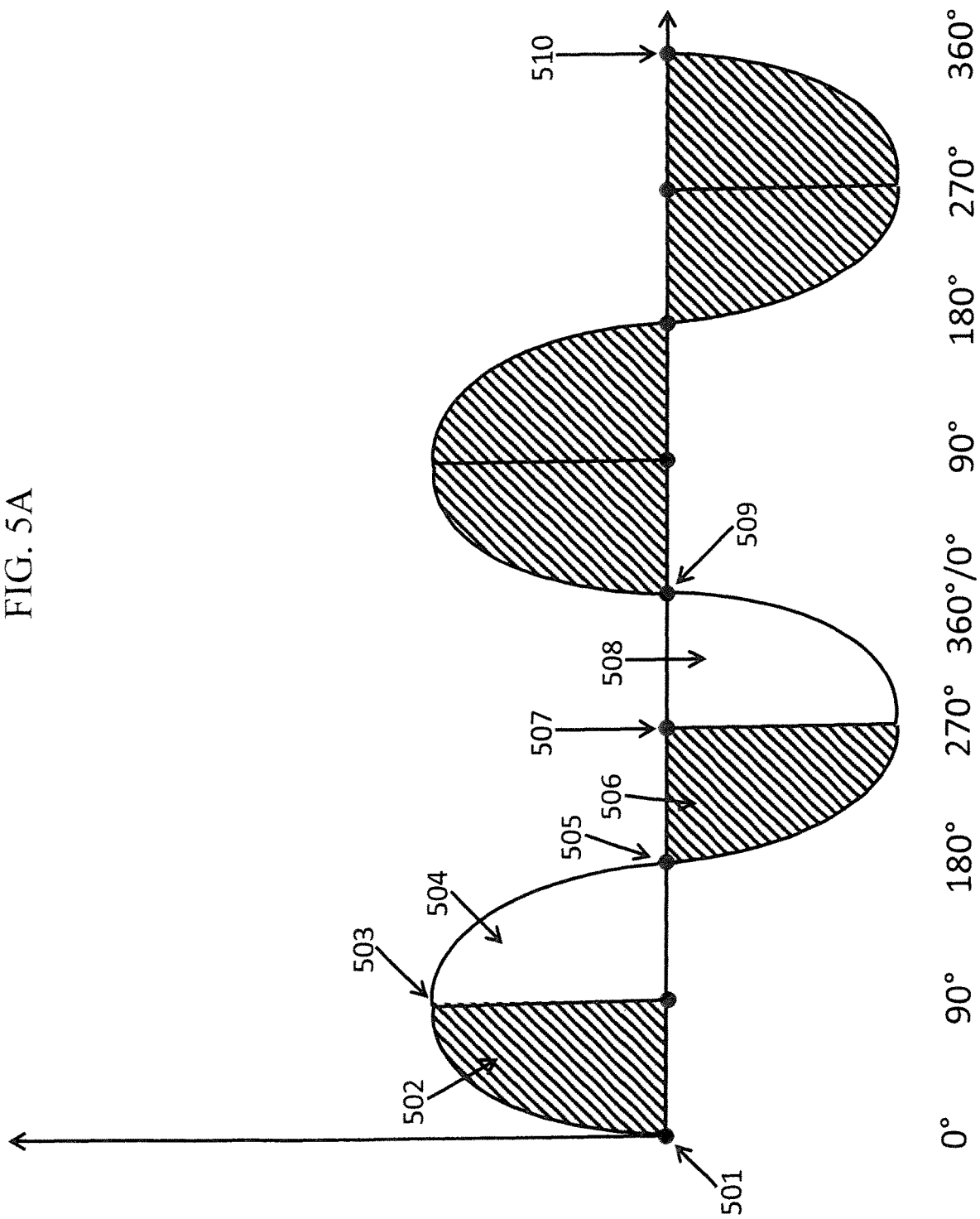
FIG. 5A is an exemplary cut wave form followed by an "off" wave of the present invention.
Figure 5B:
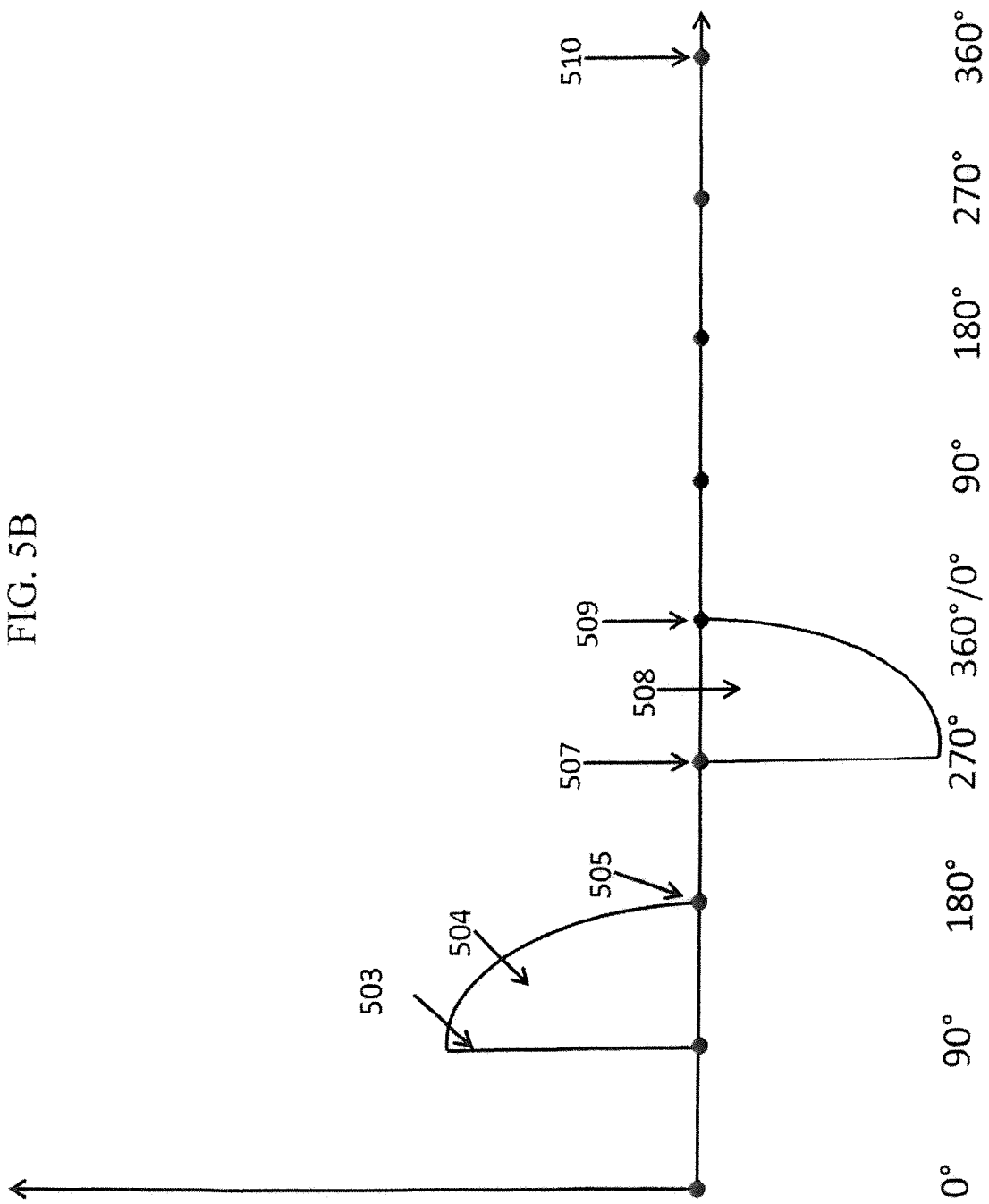
FIG. 5B is an exemplary cut wave form followed by an "off" wave of the present invention.
Figure 5C:
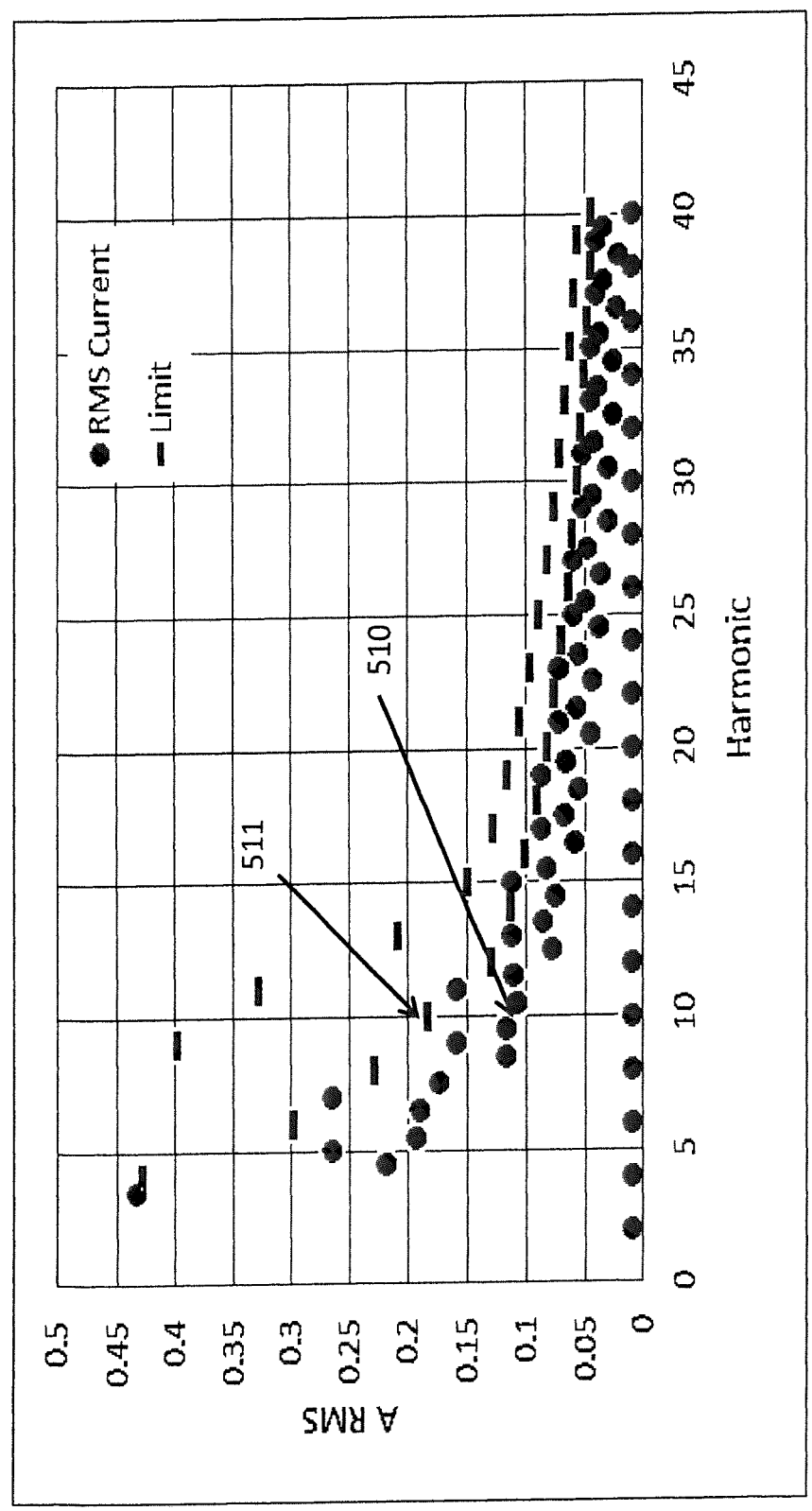
FIG. 5C shows harmonic currents plotted against standard limits showing harmonic currents by a 1150W element.

Therefore, embodiments of the inventions include a microprocessor 213 specially configured to deliver power to electric loads using wave cuts that induce harmonic currents having reduced magnitudes. As an initial matter, Applicants' testing has shown harmonic currents' magnitudes are reduced when a wave cut is immediately followed by a full wave cycle "on" or a full wave cycle "off." Applicants' test results are shown in FIGS. 4 and 5. In particular, FIG. 4A shows a first wave cycle having the same 90° cut as in FIG. 3A, but is followed by a subsequent second wave cycle (between 409 and 410) that is fully "on." Similarly, FIG. 5A shows a first wave cycle having the same 90° cut as FIG. 3A, and additionally followed by a second full wave cycle (between 509 and 510) that is fully "off." For clarity, FIGS. 4B and 5B show the same respective patterns without the "cut" portions of a wave. Applicants' testing, shown in FIGS. 4C and 5C, shows that a 90° cut induces fewer harmonics when it is followed by a subsequent full "on" or a full "off" wave cycle. These results can be seen in FIGS. 4C and 5C, where the plotted harmonic currents (points) are now below the harmonic current limits of the IEC standard (plotted as line segments), and are noticeably lower than the harmonic currents plotted in FIG. 3C. By way of example, FIG. 4C shows an exemplary RMS current point 410 that is below the harmonic limit 411. Unlike FIG. 3C, the RMS currents of FIG. 4C are under the harmonic limits. The same applies to FIG. 5C, where exemplary current point 510 is under the harmonic limit of 511.

Therefore, embodiments of the inventions include a microprocessor 213 specifically configured to follow a cut wave with either a full "on" or a full "off" wave. Moreover, microprocessor 213 may be specifically configured to draw current in a pattern that reduces harmonic currents while still managing to split the drawn current among two independent heating elements 203, 204. In other words, microprocessor 213 must manage the pattern of the overall current drawn by the electric grill 110 while simultaneously satisfying the power requirements of both independent heating elements 203, 204. The pattern of the overall current drawn by electric grill 110 may be referred to as the electric grill 110's total power array. The electric grill 110's total power array is the sum of the first heating element 203's power array plus the second heating element 204's power array. An exemplary power array may be four cells, each cell containing a value ($0.0 \le x \le 1.0$) representing a percentage of power to deliver in a wave form. Thus, an exemplary power array may represent a pattern of four waves. It will be understood that the total power (or, current) drawn by electric grill 110 is the sum of the power (current) drawn by the heating dements. The wave form patterns delivered to the heating elements 203, 204 may likewise be represented as four-celled power arrays. The first heating element's power array summed with the second heating element's power array equals the electric grills total power array. The same holds true for any number of heating elements in an electric grid 110. The electric grill 110's harmonic currents depend on the pattern of waves drawn by the electric grill 110, represented in the total power array. To reduce harmonic currents, electric grill 110's total power array should represent a pattern where each "cut" wave is followed by a full "on" or a full "off" cycle.

Figure 6:
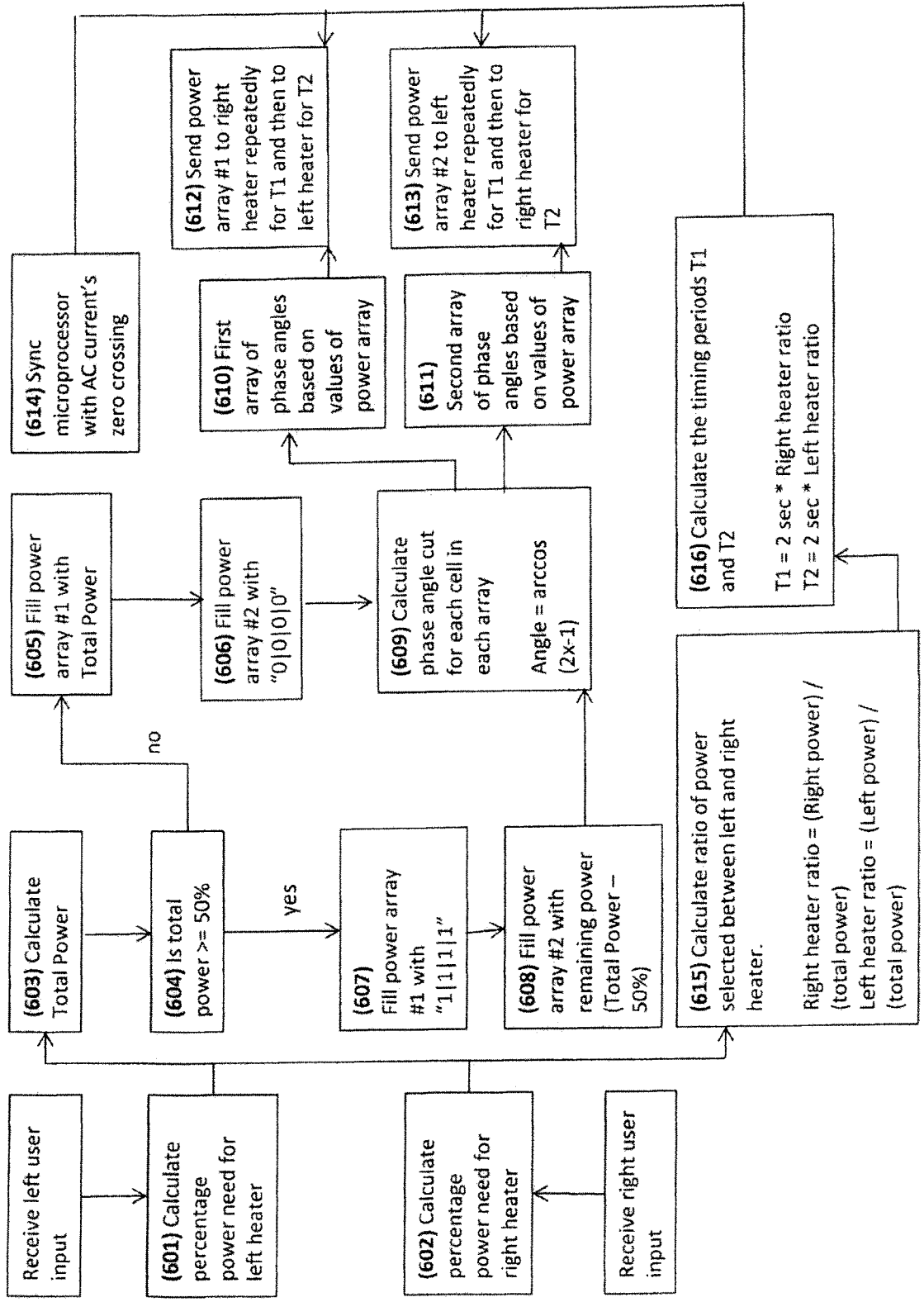
FIG. 6 is a flow chart of an exemplary microprocessor configuration of the present invention.

FIG. 6 is a flow chart showing an exemplary configuration of microprocessor 213 for controlling two heating elements while introducing fewer harmonics. Generally speaking, microprocessor 213 calculates a power array to deliver to each heating element 203, 204. The power arrays depend on a user's power settings for each of the two heating elements 203, 204 as well as feedback from thermocouples 221 and 222. In this example, each power array consists of four cells (but another number of cells may be used), each cell containing a number ranging between $0.0 \le x \le 1.0$. Each of the four cells represents a wave cycle, the cell's number indicating the percentage of power delivered during that wave cycle. By way of example, an array of "1|0|1|0" would represent one "on" wave, one "off" wave, another "on" wave, and another "off" wave. Microprocessor 213 delivers the wave forms from the two calculated power arrays to the two heating elements 203, 204 by toggling the triac drivers 211 and 212 in foe manner described above.

Addressing FIG. 6 more particularly, microprocessor 213 communicates with a first and second user input device, such as a left knob 101 and a right knob 102. The first and second user input devices convey a power level for each of the two heating elements 203, 204. The desired power levels can be converted by microprocessor 213 into a percentage of total power at steps 601 and 602. Microprocessor 213 determines if the total power 603 is greater than or equal to 50% at step 604.

Figure 7:
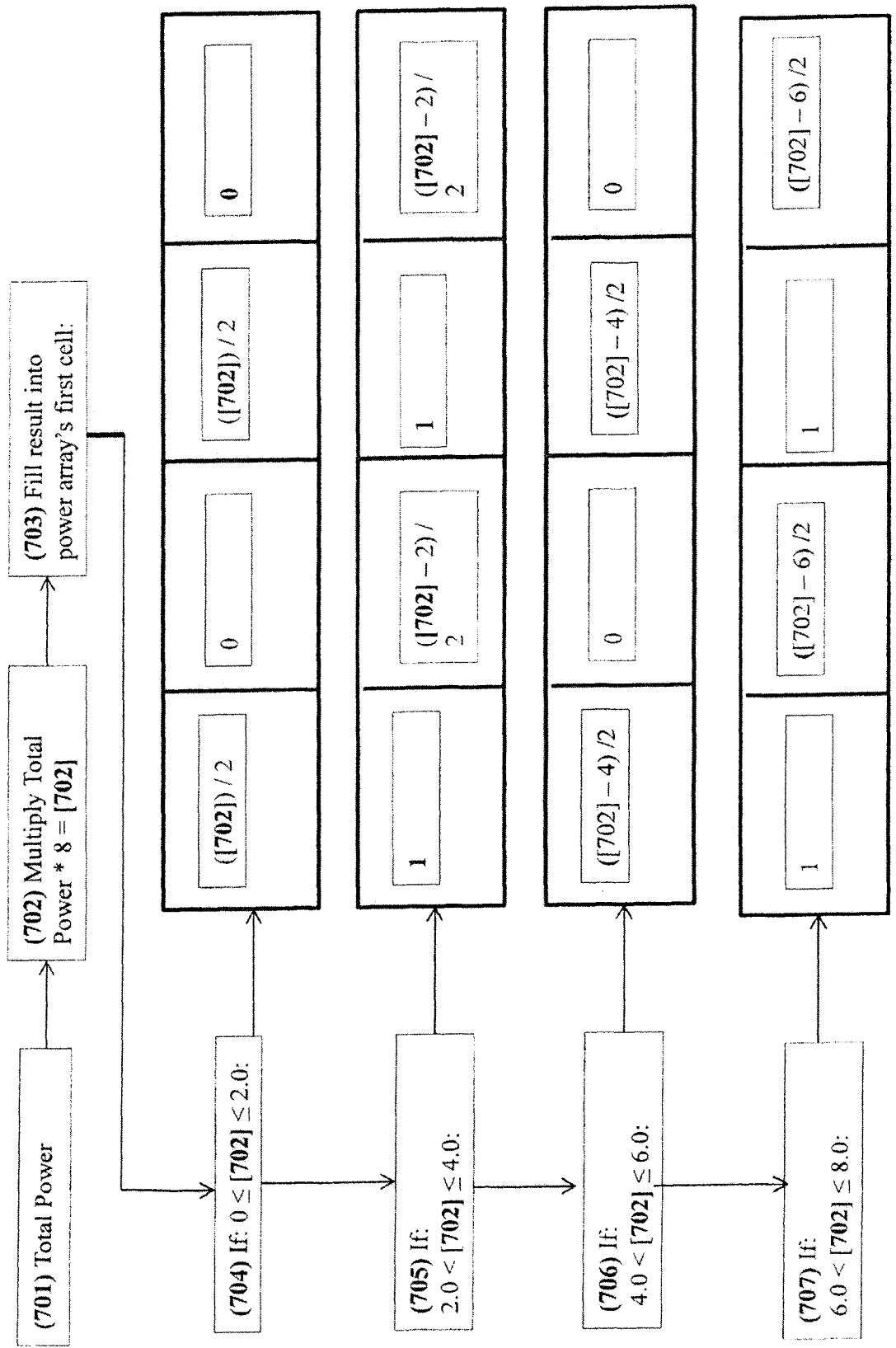
FIG. 7 is an exemplary algorithm for populating a power array of the present invention.

At 605, where a user's selected total power is less than 50%, microprocessor 213 begins filling (or, "populating") the cells of the first power array, FIG. 7 shows the steps microprocessor 213 is configured to execute to fill, or populate, a power array. As seen in FIG. 7, microprocessor 213's calculation begins at 701 with the total power requested by a user. (This is the sum of the power requested for the right heating element and the power requested by the left heating element as determined in 603). The percentage of total power requested is multiplied by 8 (because there are 2 arrays×4 cells each) at step 702. The value of step 702, herein referred to using the notation [702], is used to populate a power array at 703. If the value of 702 is less than or equal to 2.0, the value of 702 is distributed evenly between the first and third array elements to arrive at: "([702]/2)|0|([702]/2)|0." This is seen at step 704. If the value of 702 is greater than 2.0, then the first and third array elements are filled with "1," and the remainder (subtracting 2 from the value of 702) is distributed evenly between the second and fourth cells. This is seen at 705. Using this technique, a power array is constructed to have a full "on" or a full "off" wave that follows a cut wave to reduce the magnitude of harmonic currents. Moreover, the power array's alternating pattern reduces flicker, as described in more detail below. Returning now to FIG. 6, the second power array is filled with four zeros: "0|0|0|0" at step 606.

Again by reference to FIG. 6, if the Total Power 603 equals or exceeds 50%, microprocessor 213 fills the first power array with all 1's ("1|1|1|1.") at step (607). Microprocessor 213 then populates the second power array using the conditions of 706 and 707. Regardless of whether the user has requested more or less than 50% power, one of the two power arrays will have the alternating pattern "A|B|A|B," while the other array will have the pattern "C|C|C|C," where C=0 or 1. Once the first and second power array have been populated, they are delivered to the healing elements 203 and 204.

Power is delivered by microprocessor 213 to a triac driver based on the values in the four cell power arrays. As described above, each cell represents one full wave cycle, and the cell's numeric value represents the percentage of power to deliver in that wave cycle. As also described above, embodiments of the inventions may use phase cutting techniques to control power. Thus, at step 609, microprocessor 213 is configured to calculate the phase angle at which to "cut" a wave in order to achieve the power represented by a cell in a power array. Microprocessor 213 is configured to solve the equation:

$$(angle)=\arccos(2*power-1),$$

where "power" is the power represented by a number in a power array's cell. Microprocessor 213 uses this angle to deliver a wave cycle having power that corresponds to the cell's numeric value. The calculation may be repeated for each cell in each power array. Each cell of each power array may be converted into a corresponding phase angle 610 and 611. The corresponding phase angle arrays contain phase angles, rather than power percentages, and may be stored in the same format at the power arrays.

At step 614, microprocessor 213 may synchronize its timing to the phase angle of AC current in line 201. As described above, microprocessor 213 receives a zero crossing signal from zero crossing detection 210 each time the AC current crosses zero from zero crossing detection unit 210. The zero crossing signal can thus synchronize microprocessor 213's timing (and therefore by extension, the angle) of an AC wave. For example, a person of skill in the art would then recognize that a wave of AC current has the following angles at the indicated points in time:

TABLE 1

| Desired phase angle "cut" | 60 Hz AC current: Time (where zero crossing is t = 0) |
|---|---|
| 0° | 0 seconds |
| 10° | 0.000462963 seconds |
| 20° | 0.000925926 seconds |
| 30° | 0.001388889 seconds |
| 40° | 0.001851852 seconds |
| 50° | 0.002314815 seconds |
| 60° | 0.002777778 seconds |
| 70° | 0.003240741 seconds |
| 80° | 0.003703704 seconds |
| 90° | 0.004166667 seconds |

Using this information, microprocessor 213 may use an internal timing, mechanism, such as a clock signal generator or any other appropriate mechanism, to send the "on" or "enable" pulse at an instance corresponding to the angle required for the correct "cut." For example, Table 1 shows that a 90 degree cut would be made by activating a triac 0.004166667 seconds after a zero crossing. Microprocessor 213 may use a clock signal to enable a triac at the appropriate point in time. A person of skill in the art reading this disclosure would understand how to calculate the timing for any desired wave "cut."

Turning now to steps 612 and 613, the first power array is delivered to the first triac driver 211 and the second power array is delivered to the second triac driver 212 for a period of time equal to T1. This power delivery continues repeatedly for a first time period T1, after which microprocessor 213 delivers the first power array to the second triac driver 211 and delivers the second power array to the first triac driver 212 repeatedly for a second time period T2. After T1, delivery is "flipped" and the first triac driver 211 receives the second power array for duration of T2. The first and second power array, summed together, equal the electric grill 110's total power array—thus, by definition, the first and second power array must always be delivered simultaneously.

The discussion now turns to the calculation of time periods T1 and T2 at 615 and 616. The purpose of time periods T1 and T2 is to "split," or pro-rate, the total power drawn by the electric grill (or any other device using embodiments of the invention) between the two heating elements (or any other electric load) according to the independently selected power for each respective heating element. The power arrays created at steps 605 through 608 create an acceptable wave pattern for the electric grill as a whole. The sum of the power arrays, which is the electric grill 110's total power array, will have a full "on" or full "off" wave following each cut wave, which reduces the magnitude of harmonic currents. It is additionally necessary to calculate the delivery time of each power array to the respective heating elements 203, 204.

The time period T1 is calculated by taking the power setting for the first heating element 203 and dividing it by the total power selected, 603. That ratio is then multiplied by the power delivery phase, which is 2 seconds in this example but may be varied. T1 and T2 are simple ratios of a given heating element's power setting compared to the total requested power. The calculation may be summarized by the following equation:

$$T1=2\ \text{seconds}*(\text{power selection for first heating element})/((\text{power selection for first heating element})+(\text{power selection for second heating element})).$$

Similarly, T2 is the same calculation, this time for the second heating element 204:

$$T2=2\ \text{seconds}*(\text{power selection for second healing element})/((\text{power selection for first heating element})+(\text{power selection for second heating element})).$$

Figure 8:
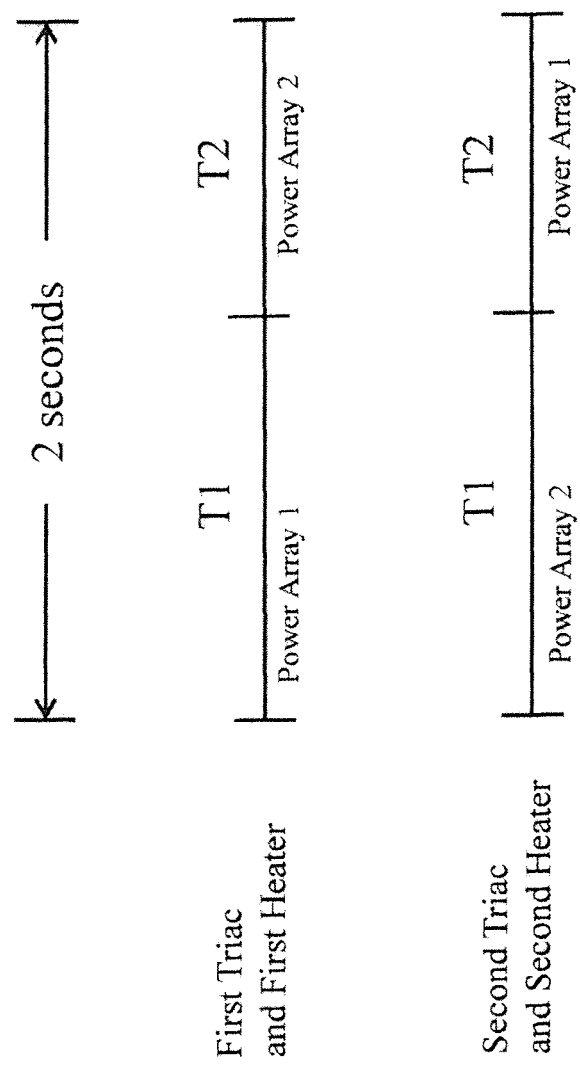
FIG. 8 shows exemplary power delivered to two heating units over a period of time of the present invention.

FIG. 8 summarizes microprocessor 213's power delivery of the first find second power array to the first and second triac drivers over a power delivery phase of 2 seconds: the first triac driver 211 (and by extension first heating element 203) receives the waves represented by the first power array for a time T1. It then receives waves represented by the cells of the second power array for a time T2. Conversely, the second triac Driver 212 (and by extension the second heating element 204) receives waves represented by the cells of the second power array during the time period T1, and then receives waves represented by the cells of the first power array during the time period T2.

Figure 9:
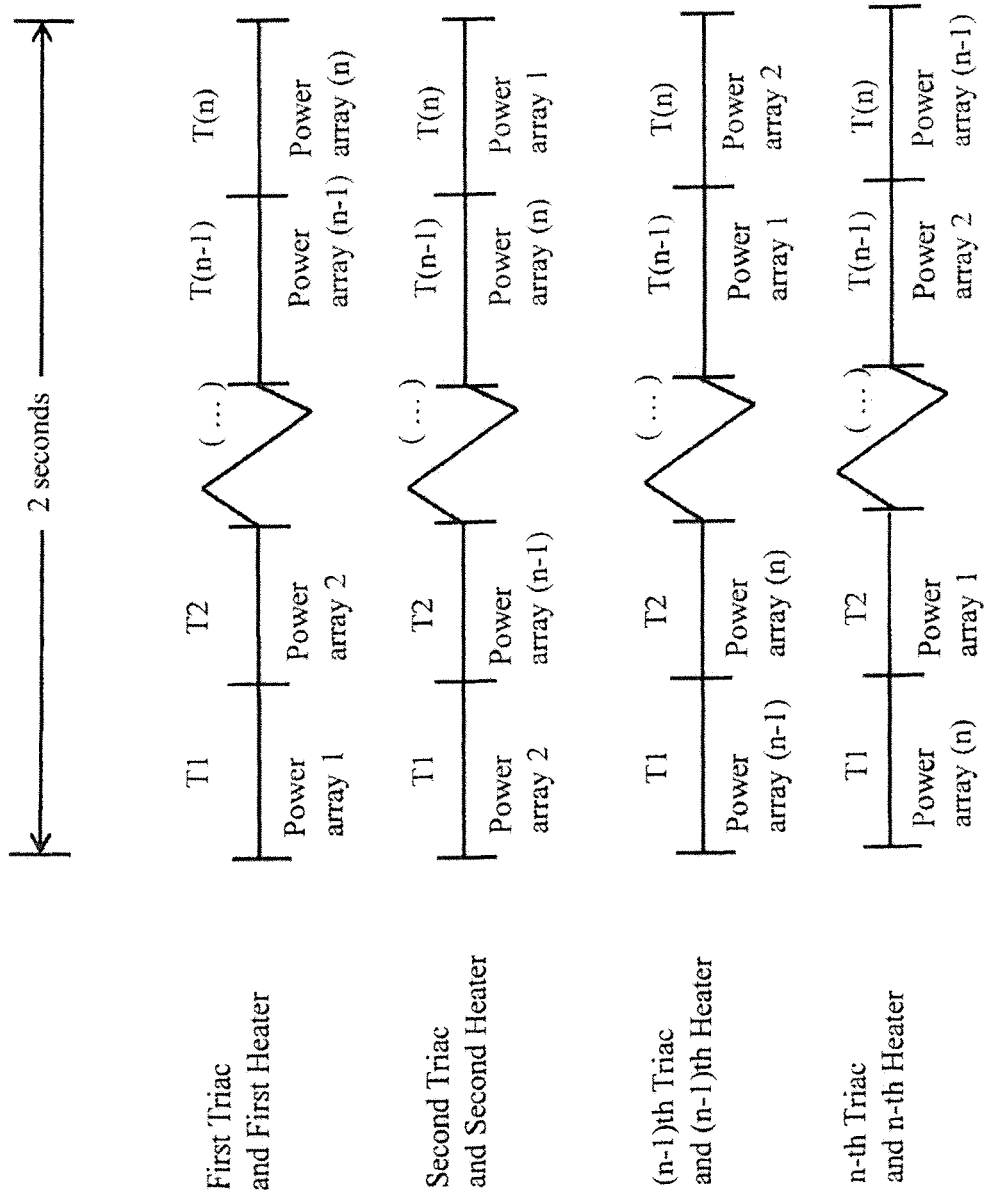
FIG. 9 shows exemplary power delivered to n-number of heating units of the present invention.

Embodiments of the present invention may be scaled to independently deliver power to more than two loads. In an embodiment where a digital power supply independently controls "n" number of loads, n power arrays are required. Moreover, the decision at 604 would compare the total power to 100%/n. The technique for filling the power arrays of FIG. 7 remains applicable, although rather than multiply by eight (8), it would be necessary to multiply step 702 by (n*4). Moreover, at steps 615 and 616, n time periods are required. FIG. 9 shows the timing of n-power arrays delivered across n-time periods. It should be understood that embodiments with multiple heaters without independent control are also contemplated by this disclosure.

The present inventions also provide methods for independently controlling two heating elements and providing variable power while providing reduced harmonic currents and flicker. In an embodiment of the invention, a user activates electric grill 110 and selects a first and second power level, for example by controlling knobs 101 and 102. By activating an electric grill 110, a user controls microprocessor 213 to execute the following steps for the benefit of controlling one or more heating elements. It is understood that some embodiments may include any number of knobs or other user inputs. By activating the electric grill 110, a user turns on microprocessor 213. Microprocessor 213 receives the user's selected power settings and performs the above-described calculations to activate triac drivers 211 and 212 in a control pattern that delivers phase-controlled wave forms to heating elements 203 and 204.

In embodiments of the invention, microprocessor 213 performs the step of calculating the appropriate phase controlled wave forms by populating two power arrays 605-608. Each power array may have four cells. Each cell contains a number "n," where 0.0≤n≤1.0. The number "n" represents a wave form having "n"-percentage of power. The waves are cut to eliminate "excess" power. Microprocessor 213 performs the step of filling in the power arrays by calculating the total power requested by all heating elements 203, 204, which may be expressed as a percentage of selected power as compared overall available power (in decimal form).

If the total power requested (i.e. the total requested power for all heating elements) by the user is less than 50% of the overall available power, microprocessor 213 performs the step of filling in the first power array (605). The power array is populated by distributing the total power number into the power arrays four cells. At 606, microprocessor 213 performs the step of filling all zeros into the second power array (i.e. "0000"). If the total power requested by the user is greater than, or equal to, 50% of the overall power, microprocessor 213 performs the steps of fillings the first power array with 1's (i.e. "1|1|1|1") and the second power array is filled (with Total Power−50%, i.e. [702] minus 4) according to the steps of FIG. 7.

Once the first and second power array are calculated, microprocessor 213 delivers wave forms corresponding to the cells of each power array. In particular, each cell's value represents the percentage of power to deliver in one wave cycle. To deliver a wave having any given percentage of power, microprocessor 213 calculates a phase angle=arc cos(2*x−1), where x is the power percentage described in any given cell. Microprocessor 213 uses the calculated angle to deliver an "on" signal to triac Drivers 211 or 212 at a point in time corresponding to the calculated phase angle. Microprocessor 213 may use a zero crossing signal and the above-described Table 1 to determine the correct timing.

Microprocessor 213 repeatedly delivers the first power array to the first triac driver 211 and the second power array to the second triac driver 212 for a time period T1. After T1 has passed, microprocessor 213 "flips" the first and second power array for a time period T2. In other words, as seen in FIG. 8, after T1 ends and T2 begins, the first power array is delivered to the second triac driver 212 and the second power array is delivered to the first triac driver 211.

Microprocessor 213 performs the step of calculating T1 and T2 as:

$T1 = 2$ seconds*(First heater total power/Combined heater total power)

$T2 = 2$ seconds*(Second heater total power/Combined heater total power).

Mathematically, it follows that the power delivery phase of $T1*T2=2$ seconds.

In this way, the power arrays are delivered for a combined power delivery phase of 2 seconds. It is contemplated that longer or shorter power delivery phases may be used. After 2 seconds, microprocessor 213 may re-calculate the power arrays. By re-calculating the power arrays, microprocessor 213 may account for a change in user settings, or to switch from raising a heating element's temperature to maintaining a temperature.

An operating example applying the devices and methods described above is provided. For example, a user may wish to use the grill 110 with different power levels for the first and second heating elements 203 and 204—for instance, microprocessor 213 may determine that a first heating element 203 should have 17.5% of its maximum power, and a second heating element 204 should have only 5% of its maximum power. In accordance with the embodiments described herein, microprocessor 213 is configured to deliver 17.5% and 5% power, respectively, while drawing power in a pattern that reduces the harmonic currents introduced by the electric grill into the AC wall outlet.

In this example, the first and second power arrays are calculated as follows: the first and second selected power levels are combined to arrive at a total selected power: 17.5%+5%=22.5%, or 0.225 (See 603). Because this is less than 50%, microprocessor 213 proceeds with step 605. Using the techniques described herein, microprocessor 213 multiplies by eight (8) to arrive at 0.225*8=1.8. Next, microprocessor 213 fills the value 1.8 into the first power array. In particular, the first cell and third cells receive the value of (1.8)/2=0.9. The second and fourth cells remain "0." Thus, the first power array is "0.9|0|0.9|0" and the second power array is "0|0|0|0."

For a time period T1, the first power array is delivered to the first triac driver 211 and the second power array is simultaneously delivered to the second triac driver 212. In delivering the first and second power array, microprocessor 213 sends an "on" signal to the respective triac driver 211 and/or 212 at a time that corresponds to the "cut" of the wave. For example, the first power array's first cell dictates that a 90% power wave (i.e. 0.9) is delivered. A 90% power wave requires a "cut" angle of arc cos(2*0.9−1)=36.86°. Microprocessor 213 delivers a 90% power wave by turning triac driver 211 "on" at 36.86°. Similar to the values of Table 1, a 36.86° cut can be made by delivering power 0.0017 seconds after a zero crossing. Subsequently, the second cell dictates that an "off" wave having 0% is delivered. The third wave is the same as the first wave, i.e. cut at 36.86°, and the fourth wave is the same as the second wave, i.e. "off." The second power array in this example is "0|0|0|0," thus the second triac driver 212 is never activated.

This delivery pattern is continued for a time period T1 as described at 612 and 613. Here, T1 is calculated as T1=2 seconds*(First heater total power/Combined heater total power)=2*(0.175/0.225)=2*0.78=1.56 seconds. Similarly, T2=2*(0.05/0.225)=0.44 seconds. In this example, the first power array ("0.9|0|0.9|0") is delivered to the first heating element 203 and the second power array ("0|0|0|0") is delivered to the second heating element 204 for T1=1.56 seconds. After 1.56 seconds, microprocessor "flips" the delivery of foe first and second power array for a period of 0.44 seconds. After a combined 2 seconds have passed, microprocessor 213 may begin by re-filling the first and second power array according to the power needs at that point in time.

Figure 10:
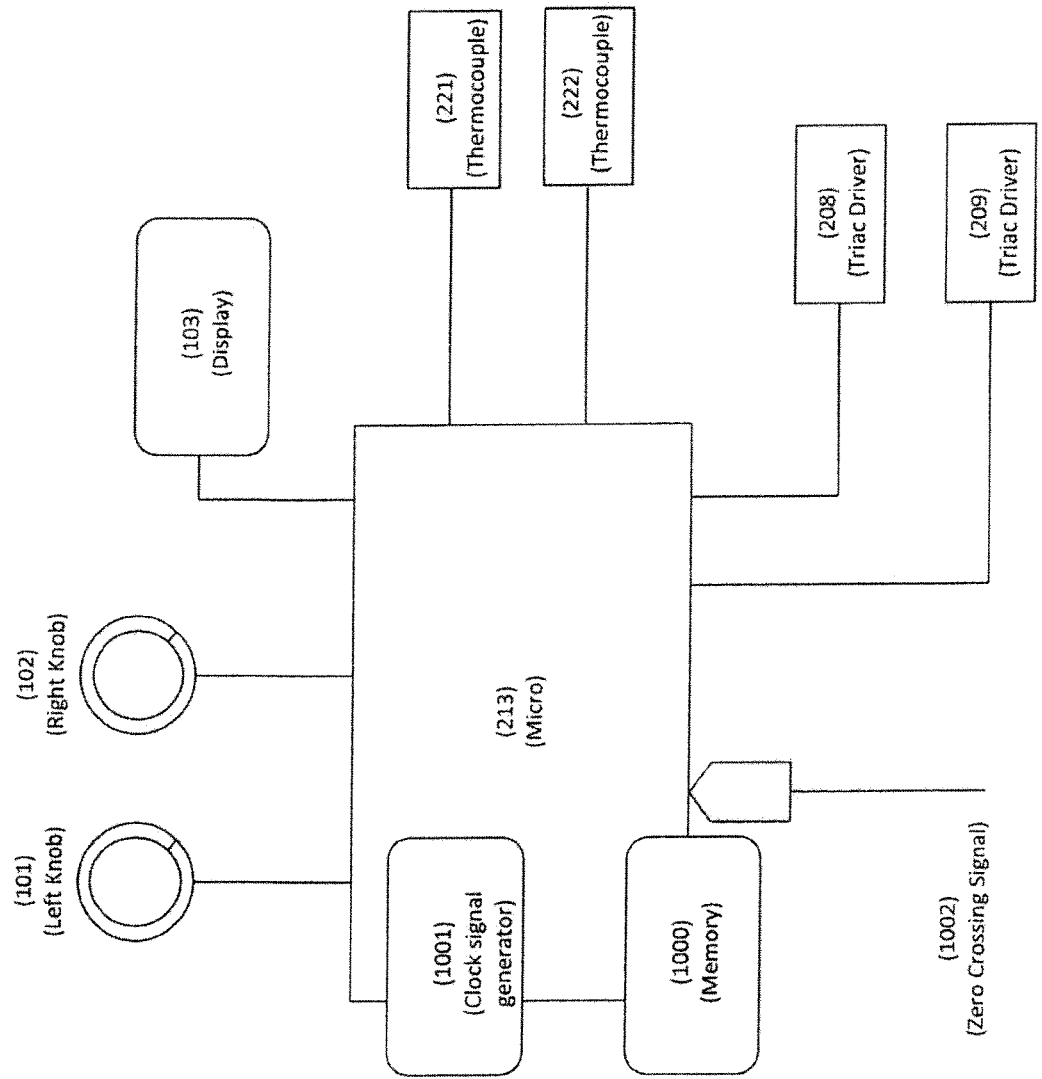
FIG. 10 is a flow chart of exemplary inputs and outputs to a microprocessor of the present invention.

It will be understood that microprocessor 213 may include internal or external memory 1000 for reading and/or writing in connection with executing the steps and configurations described herein. Moreover, it will be understood that microprocessor 213 may have an internal or external clock signal that may be used to time for "on" signal sent to a triac. The clock signal may be generated by an on-board clock signal generator 1001, or by an external clock. FIG. 10 is an exemplary schematic showing inputs and outputs to microprocessor 213. Examples include a left and right knob 101, 102 and a display 103. Additional examples include thermocouples 221, 222, and communication with triac Drivers 208 and 209. Memory 1000 and clock 1001 are also shown, as is the input signal 1002 from zero crossing unit 210.

Figure 11:
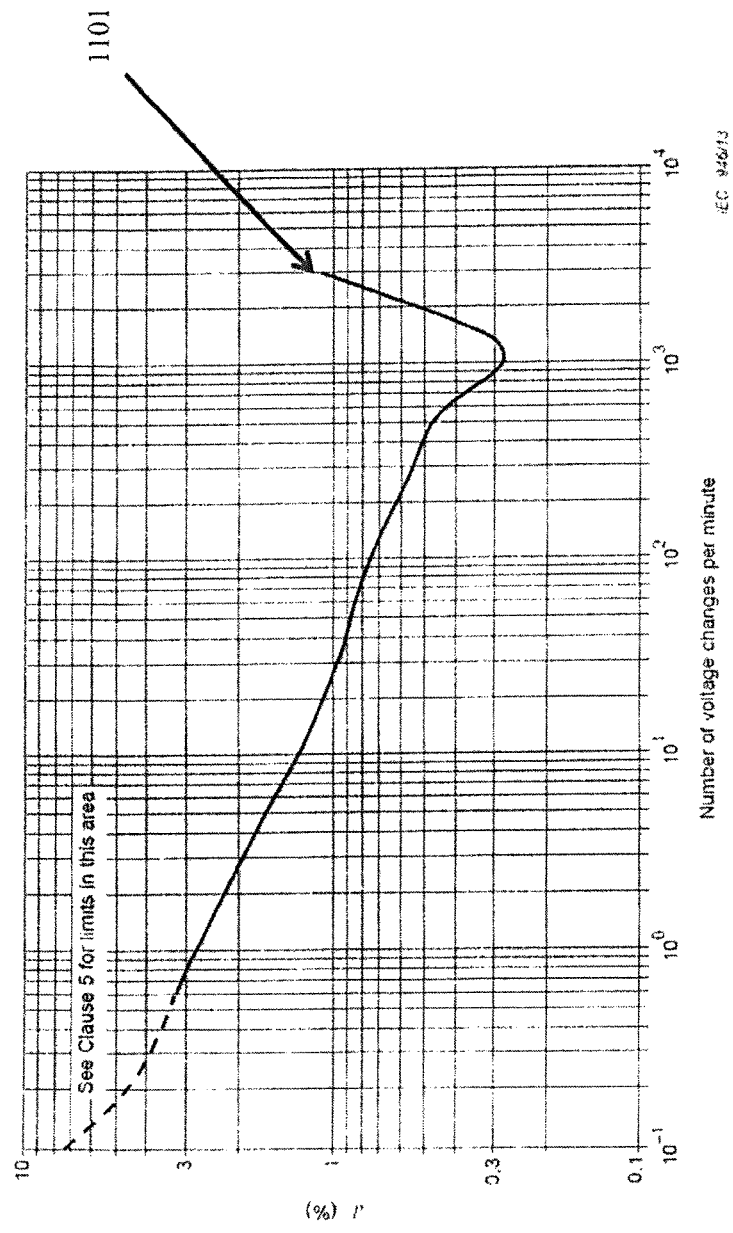
FIG. 11 shows standard (IEC 61000-3-3) limits for flicker.

An additional benefit of embodiments of the devices and methods described herein is a reduction in flicker introduced by the digital power supply 200 into a wall outlet. Flicker is undesirable because, at certain frequencies, it will cause lights connected to an outlet to flicker or dim. FIG. 11 shows the flicker limits of IEC 61000-3-3 *Electromagnetic compatibility (EMC)—Part 3-3 (Voltage Fluctuations and Flicker)*. Flicker is measured as a % change in voltage.

Embodiments of the present invention may reduce flicker levels to a wall outlet based on voltage changes resulting from wave-cuts within a single power delivery phase. A person of skill in the art would recognize that flicker is commonly measured during a devices "steady state."

The voltage changes within a single power deliver phase comply with the flicker regulations. As seen at 1101 (and further described in the standard), the IEC 61000-3-3 requirement's last data point occurs at 2875 voltage changes per minute. This equates to a cycling frequency of 23.96 Hz. In other words, voltage changes occurring at a frequency above 23.96 Hz have no flicker requirement because they are beyond human perception. Embodiments of the devices and methods disclosed herein create a wave pattern in which electric grill 110 alternates between a cut wave and a full "on" or a full "off" wave. Following this pattern, electric grill 110 would create 25 voltage changes per second (25 Hz) at 50 Hz AC and 30 voltage changes per second (30 Hz) at 60 Hz AC. A cut wave followed by a full wave counts as one voltage change. The 25 Hz and 30 Hz cycling frequencies are above the standard's last data point of 23.96 Hz and therefore comply with flicker requirement.

An additional benefit of embodiments of the invention comes from splitting power into multiple power arrays and delivering them to multiple heating elements. Using the techniques described in FIGS. 6 and 7, one of the power arrays will always be "0|0|0|0" or "1|1|1|1." This ensures that only one of healing element 203 or 204 can receive a "cut" wave at any given time. As a result, the electric grill 110's used current (or power) will never be dropped by more than half (½) of the maximum rated power. To give an example, if two heating elements 203 and 204 each draw 1150 Watts, for a combined 2300 Watts drawn by the electric grill 110, then even a 90° in one heating element 203 or 204 would only result in a maximum power drop of 1150 Watts. This helps reduce the magnitude of harmonic currents.

Embodiments of the disclosed digital power supply and method for delivering power may optionally be implemented in the circuitry of an electric grill. FIG. 2 shows additional components that may optionally be added to the protection circuitry 200 to provide circuitry for an electric grill. For example, line 201 and neutral 202 may connect to a step down transformer 215 to which zero crossing detection unit 210 is connected. Step down transformer 215 provides a reduced secondary voltage so that zero crossing detection unit 210 may detect zero crossings in AC current between line 201 and neutral 202 without being exposed to high voltages.

Further optional embodiments include a full wave rectifier 216 that feeds to a ground fault detection unit 217, which in turn communicates with a trip controller 218 for tripping an electromechanical latch 206 or 207. Ground fault detection unit 217 may receive a signal indicating a current imbalance between line 201 and neutral 202 and cause the latches to trip to prevent hazardous current situations.

Additional optional embodiments include a watchdog monitor 220 which monitors the operation of microprocessor 213 and may disable triac drivers 211 and 212 in the event of a failure of microprocessor 213. Also provided are AC/DC power converters 214 which may be used to power the microprocessor 213, and a current sensor, such as Hall Effect sensor 219, which may be used by microprocessor 213 to monitor the current flowing to heating elements 203 and 204.

For the reasons described above, some embodiments of the inventions may provide a digital power supply that increases a heating element's lifespan; complies with flicker requirements, and also complies with harmonic requirements. These benefits may be accomplished using the devices and methods described herein. For example, using a power delivery phase of 2 seconds prevents the heating elements from ever fully expanding or fully contracting. Lengthy power delivery phases that allow a heating element to fully expand or contract are very detrimental to the heating element's lifespan. The flicker requirement is satisfied by creating a total power array that describes an alternating wave pattern which has a cycling frequency of 25-30 Hz depending on the AC current. Moreover, the total power array that may be created using devices and methods of the invention follow every cut wave with a full "on" or full "off" wave, thus reducing harmonic currents. Harmonic currents are also reduced by splitting the combined load of electric grill 110 to two or more elements.

The above description is not intended to limit the meaning of the words used in or the scope of the following claims that define the invention. Rather the descriptions and illustrations have been provided to aid in understanding the various embodiments. It is contemplated that future modifications in structure, function or result will exist that are not substantial changes and that all such insubstantial changes in what is claims are intended to covered by the claims. Thus, while preferred embodiments of the present inventions have been illustrated and described, one of skill in the art will understand that numerous changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A digital power supply comprising:
   a first and second user input;
   a first and second triac connected to a first and second heating elements of an electric grill, respectively, and further connected to a voltage line;
   a first and second triac driver respectively in communication with the first and second triac; and
   a microprocessor in communication with the first and second triac drivers and in communication with the first and second user input, wherein the microprocessor is to execute instructions to cause the microprocessor to:
   calculate a total power requested by the first and second user inputs;
   populate a first and second power array based on the total power requested;
   calculate a first and second array of phase angles based on respective values of the first and second power array;
   calculate a first ratio representing a first amount of power requested by the first user input divided by the total power requested;
   calculate a second ratio representing a second amount of power requested by the second user input divided by the total power requested;
   compute first and second timing periods based on the first ratio and the second ratio; and
   cause delivery of a first phase-controlled AC wave pattern comprising phase-controlled AC wave cycles corresponding to the first array of phase angles to the first heating element during the first timing period, and a second phase-controlled AC wave pattern comprising phase-controlled AC wave cycles corresponding to the second array of phase angles to the second heating element during the second timing period.

2. The digital power supply of claim 1, wherein the first and second power array each have four cells.

3. The digital power supply of claim 2, wherein the microprocessor is to populate the cells of at least one of the first and second power array with two alternating values.

4. The digital power supply of claim 1, wherein the microprocessor is to turn on the first and second triacs in a timing pattern that corresponds to a phase-controlled waveform in the first and second phase angle arrays.

5. The digital power supply of claim 1, wherein the microprocessor is to calculate respective angle values of the first and second array of phase angles by applying the function arccos (2x−1) to the respective values of the first and second power array, where x represents a respective value of the first and second power array.

6. The digital power supply of claim 5, wherein the first and second array of phase angles include numeric values ranging from zero to one, and each value represents a percentage of power delivered in one phase-controlled AC wave cycle.

* * * * *